(12) United States Patent
Wang

(10) Patent No.: US 12,425,253 B2
(45) Date of Patent: Sep. 23, 2025

(54) SYSTEMS AND METHODS FOR CONTROLLING USER DATA CONSUMPTION

(71) Applicant: GOGO BUSINESS AVIATION LLC, Broomfield, CO (US)

(72) Inventor: Zhiyong Wang, Vernon Hills, IL (US)

(73) Assignee: GOGO BUSINESS AVIATION LLC, Broomfield, CO (US)

( * ) Notice: Subject to any disclaimer, the term of this patent is extended or adjusted under 35 U.S.C. 154(b) by 0 days.

(21) Appl. No.: 18/386,173

(22) Filed: Nov. 1, 2023

(65) Prior Publication Data

US 2025/0141706 A1  May 1, 2025

(51) Int. Cl.
 *H04L 67/12* (2022.01)
 *H04L 12/14* (2006.01)
(52) U.S. Cl.
 CPC .......... *H04L 12/1435* (2013.01); *H04L 67/12* (2013.01)
(58) Field of Classification Search
 CPC ............................ H04L 12/1435; H04L 67/12
 USPC ......................................................... 709/224
 See application file for complete search history.

(56) References Cited

U.S. PATENT DOCUMENTS

| | | | | |
|---|---|---|---|---|
| 10,462,306 | B1* | 10/2019 | Siebels | H04W 4/24 |
| 11,314,945 | B1* | 4/2022 | Nguyen | G06F 40/42 |
| 11,553,042 | B2 | 1/2023 | Wahler | |
| 11,658,867 | B1* | 5/2023 | Kushwaha | H04M 15/8038 |
| | | | | 709/224 |
| 2015/0350457 | A1 | 12/2015 | Lauer | |
| 2019/0182838 | A1* | 6/2019 | Bondarenko | H04M 15/7652 |
| 2019/0297487 | A1* | 9/2019 | Muñoz Sanchez | H04L 41/5029 |
| 2020/0214054 | A1* | 7/2020 | Qiao | H04L 47/824 |
| 2020/0296177 | A1* | 9/2020 | Hammer | G06Q 30/0202 |
| 2020/0351626 | A1* | 11/2020 | Libby | H04M 15/64 |
| 2020/0389331 | A1* | 12/2020 | Karri | H04L 47/781 |
| 2021/0122261 | A1* | 4/2021 | Qiao | H04W 4/40 |
| 2021/0127303 | A1* | 4/2021 | Yoon | H04W 24/08 |
| 2021/0194709 | A1* | 6/2021 | Yadav | H04M 15/735 |
| 2022/0104005 | A1* | 3/2022 | Xiong | H04W 12/45 |
| 2022/0167176 | A1* | 5/2022 | Khalid | H04W 72/0453 |

(Continued)

OTHER PUBLICATIONS

International Application No. PCT/US2024/053042, International Search Report and Written Opinion, mailed Feb. 6, 2024.

*Primary Examiner* — Karen C Tang
(74) *Attorney, Agent, or Firm* — Holland & Hart LLP

(57) ABSTRACT

Techniques for controlling user data consumption are disclosed herein. An example method includes receiving a user connection to a network on-board a vehicle, the network being an on-board network; and executing a volume control with credit (VCC) algorithm. Executing the VCC algorithm includes provisioning a data credit for the user connection corresponding to an initial usage estimate, placing the user connection into a first mode, initiating a timer associated with the user connection, and iteratively provisioning additional data credits associated with the user connection based on the timer. Executing the VCC algorithm further includes determining whether the user corresponding to the user connection has consumed data through the on-board network in excess of the data credit and the additional data credits; and responsive to determining that the user has consumed data in excess of the data credit and the additional data credits, placing the user connection into a second mode.

20 Claims, 9 Drawing Sheets

(56) References Cited

U.S. PATENT DOCUMENTS

| | | | |
|---|---|---|---|
| 2022/0286822 A1* | 9/2022 | Saxena | H04M 15/66 |
| 2022/0322202 A1* | 10/2022 | Li | H04M 15/93 |
| 2022/0413708 A1 | 12/2022 | Canepa | |
| 2023/0027934 A1* | 1/2023 | Raleigh | H04L 12/1407 |
| 2023/0029236 A1* | 1/2023 | Qiao | H04M 15/61 |

* cited by examiner

SYSTEMS AND METHODS FOR CONTROLLING USER DATA CONSUMPTION

FIELD OF THE DISCLOSURE

The present disclosure generally relates to controlling user data consumption, and more particularly, to iteratively provisioning network users with data credits, monitoring the usage of such data credits, and intelligently adjusting data shaping applied to the users' network data consumption based on the data credit usage.

BACKGROUND

Individuals may generally bring their personal computing or electronic devices (e.g., cell phone, laptop, e-reader, tablet, smart device, etc.) on-board a vehicle and utilize their devices to access on-board communications networks while the vehicle is in transit. For example, an individual may utilize their laptop or smart phone to access a wireless network on-board an aircraft during flight to communicatively connect to other devices on-board the aircraft, to other devices on the ground, to the Internet, to other ground-based networks, etc., and/or to access various services and applications. The on-board communications network is typically provided by a vehicle-based communication service provider (e.g., an aircraft-based wireless Internet service provider).

For ease of discussion herein, an entity that provides and/or operates at least a portion of one or more on-board communications networks, and that provides and/or operates communications services and connectivity for the public's personal computing devices via the one or more on-board communications networks is generally referred to herein as a "service provider" or an "on-board service provider." For example, an on-board service provider may be an airline (or another company that is contracted by an airline) that provides in-flight communications services to passengers. A "user," as generally used herein, refers to a person who operates, utilizes, carries, holds, or otherwise interacts with a computing device, such as a passenger, crew member, or other human being. For example, a user may purchase or otherwise receive services from an on-board service provider (e.g., in-flight communication services, entertainment services, etc.), and may utilize his or her personal device to access those services via the on-board network while he or she is on-board the vehicle.

In any event, many existing on-board communications networks may include and/or implement some form of network traffic management. For example, a conventional on-board communications network may implement a fixed quota enforcement feature, where the network provisions a fixed quota of data to each user accessing the network over predetermined time periods. The same fixed quota of data is generally re-applied to each user after the predetermined time period has passed, resulting in several issues. Namely, such a conventional fixed quota enforcement strategy severely shapes the network traffic for users that exceed the provisioned data quota. These users then face long loading times for web pages, applications, and/or other data accessed through the on-board communications network, which in turn, creates an unsatisfactory user experience. Thus, shaping network traffic of high data consuming users is a topic of great interest in the on-board communications network industry.

Accordingly, a need exists for systems and methods for controlling users data consumption to improve the user experience for all users connected to an on-board communications network.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In an embodiment, the present invention is a method for controlling user data consumption, and the method may comprise: receiving, at one or more processors, a user connection to a network on-board a vehicle, the network being an on-board network; and executing, by the one or more processors, a volume control with credit (VCC) algorithm by: provisioning, by the one or more processors, a data credit for the user connection corresponding to an initial usage estimate; placing, by the one or more processors, the user connection into a first mode; initiating, by the one or more processors, a timer associated with the user connection; iteratively provisioning, by the one or more processors, additional data credits associated with the user connection based on the timer; determining, by the one or more processors, whether the user corresponding to the user connection has consumed data through the on-board network in excess of the data credit and the additional data credits; and responsive to determining that the user has consumed data in excess of the data credit and the additional data credits, placing, by the one or more processors, the user connection into a second mode.

In a variation of this embodiment, the method may further comprise: continuously provisioning, by the one or more processors, the additional data credits to the user connection based on a current time from the timer, the initial usage estimate, and a time interval threshold.

In another variation of this embodiment, the first mode may be a high shaper mode, the second mode may be a low shaper mode, and the method may further comprise: placing, by the one or more processors, the user connection into the second mode by applying a low shaper to network traffic consumed through the user connection.

In yet another variation of this embodiment, iteratively provisioning the additional data credits may further comprise: determining, by the one or more processors, that a time indicated by the timer has exceeded a predetermined time interval; and provisioning, by the one or more processors, the additional data credits.

In still another variation of this embodiment, the method may further comprise: responsive to placing the user connection into the second mode, holding, by the one or more processors, the user connection in the second mode for a minimum time. Further in this variation, the method may further comprise: determining, by the one or more processors, (i) the user has no longer consumed data in excess of the data credit and the additional data credits and (ii) the minimum time has elapsed; and placing, by the one or more processors, the user connection into the first mode.

In yet another variation of this embodiment, the method may further comprise: determining, by the one or more processors, that data consumed by the user is less than the data credit and the additional data credits by a ceiling value; and withholding, by the one or more processors, a subsequent data credit from the user connection.

In still another variation of this embodiment, iteratively provisioning the additional data credits may further comprise: provisioning, by the one or more processors, an initial additional data credit in response to the user consuming the data credit; and iteratively provisioning, by the one or more processors, subsequent additional data credits based on the timer.

In yet another variation of this embodiment, the vehicle is an aircraft.

In another embodiment, the present invention is a system for controlling user data consumption. The system may comprise: one or more processors; and a non-transitory computer-readable memory coupled to the one or more processors, the memory storing a volume control with credit (VCC) algorithm and instructions thereon that, when executed by the one or more processors, cause the one or more processors to: receive a user connection to a network on-board a vehicle, the network being an on-board network, and execute the VCC algorithm by: provisioning a data credit for the user connection corresponding to an initial usage estimate, placing the user connection into a first mode, initiating a timer associated with the user connection, iteratively provisioning additional data credits associated with the user connection based on the timer, determining whether the user corresponding to the user connection has consumed data through the on-board network in excess of the data credit and the additional data credits, and responsive to determining that the user has consumed data in excess of the data credit and the additional data credits, placing the user connection into a second mode.

In a variation of this embodiment, the instructions, when executed, may further cause the one or more processors to: continuously provision the additional data credits to the user connection based on a current time from the timer, the initial usage estimate, and a time interval threshold.

In another variation of this embodiment, the first mode may be a high shaper mode, the second mode may be a low shaper mode, and the instructions, when executed, may further cause the one or more processors to: placing, by the one or more processors, the user connection into the second mode by applying a low shaper to network traffic consumed through the user connection.

In yet another variation of this embodiment, the instructions, when executed, may further cause the one or more processors to iteratively provision the additional data credits by: determining that a time indicated by the timer has exceeded a predetermined time interval; and provisioning the additional data credits.

In still another variation of this embodiment, the instructions, when executed, may further cause the one or more processors to: responsive to placing the user connection into the second mode, hold the user connection in the second mode for a minimum time. Further in this variation, the instructions, when executed, may further cause the one or more processors to: determine (i) the user has no longer consumed data in excess of the data credit and the additional data credits and (ii) the minimum time has elapsed; and place the user connection into the first mode.

In yet another variation of this embodiment, the instructions, when executed, may further cause the one or more processors to: determine that data consumed by the user is less than the data credit and the additional data credits by a ceiling value; and withhold a subsequent data credit from the user connection.

In still another variation of this embodiment, the instructions, when executed, may further cause the one or more processors to iteratively provision the additional data credits by: provisioning an initial additional data credit in response to the user consuming the data credit; and iteratively provision subsequent additional data credits based on the timer.

In yet another variation of this embodiment, the vehicle is an aircraft.

In still another embodiment, the present invention is a tangible non-transitory computer-readable medium comprising instructions for controlling user data consumption that, when executed, may cause a machine to at least: receive a user connection to a network on-board a vehicle, the network being an on-board network; and execute a volume control with credit (VCC) algorithm by: provisioning a data credit for the user connection corresponding to an initial usage estimate; placing the user connection into a first mode; initiating a timer associated with the user connection; iteratively provisioning additional data credits associated with the user connection based on the timer; determining whether the user corresponding to the user connection has consumed data through the on-board network in excess of the data credit and the additional data credits; and responsive to determining that the user has consumed data in excess of the data credit and the additional data credits, placing the user connection into a second mode.

In a variation of this embodiment, the first mode may be a high shaper mode, the second mode may be a low shaper mode, and the instructions, when executed, may further cause the machine to at least: responsive to placing the user connection into the second mode, hold the user connection in the second mode for a minimum time; determine (i) the user has no longer consumed data in excess of the data credit and the additional data credits and (ii) the minimum time has elapsed; and place the user connection into the first mode.

DETAILED DESCRIPTION

Figure 1A:
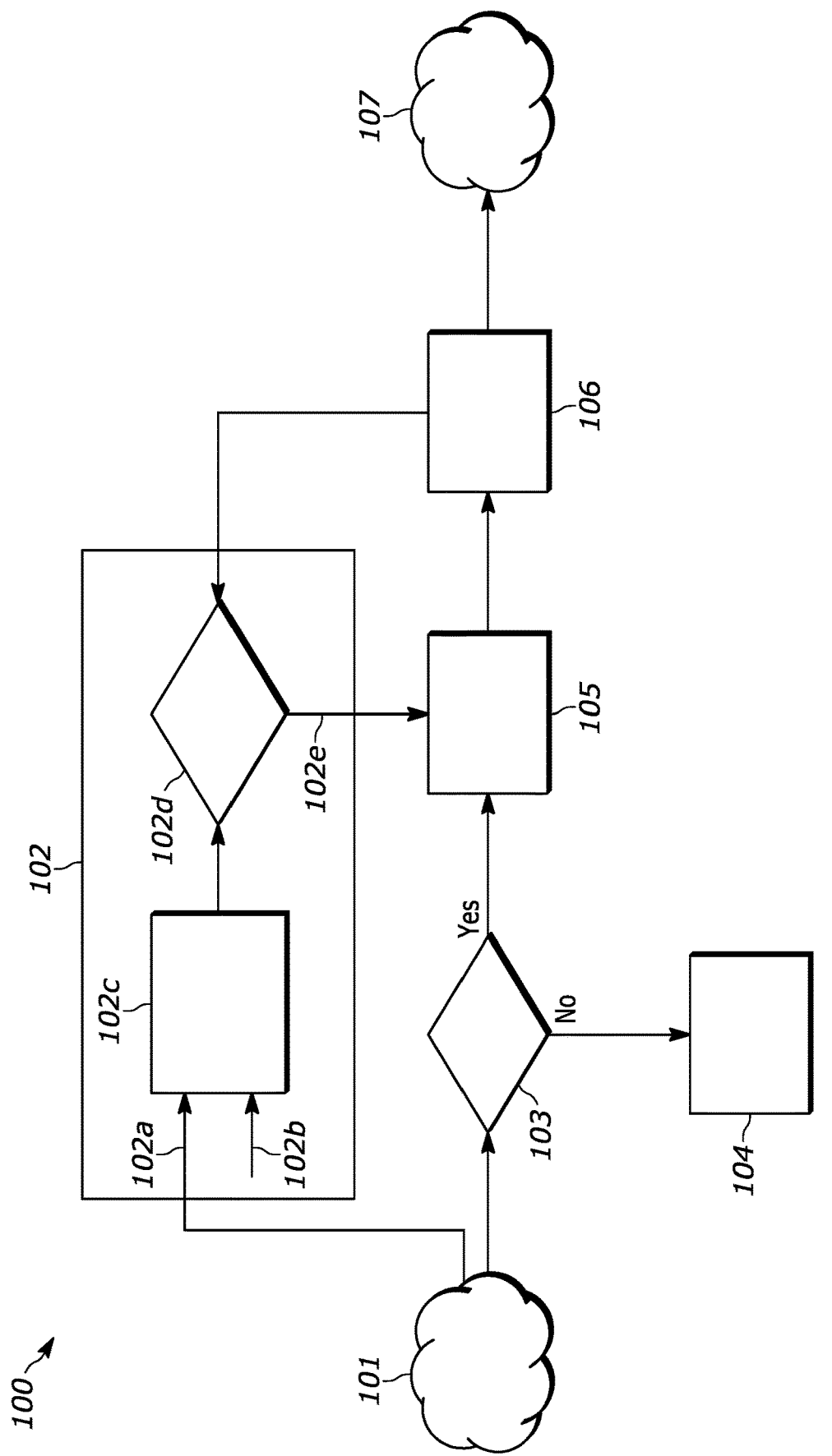
FIG. 1A shows an example network traffic management scenario implementing a volume control with credit (VCC) algorithm to control user data consumption across an on-board communications network, in accordance with various embodiments herein.

As discussed above, conventional network traffic management techniques struggle to shape network traffic for high data consumption users in a manner that avoids significant performance issues. The techniques described in the present disclosure overcome these challenges experienced by conventional techniques by introducing a VCC algorithm configured to shape high data consuming user network traffic. Generally, the VCC algorithm estimates an expected usage for each user over time, provisions/applies data credits for the network connections associated with each user and monitors each user's data consumption to determine an appropriate data shaper to apply to the user's network connection based on the expected usage, provisioned/applied data credits, and the user's current data consumption level.

Additionally, the VCC algorithm may implement various techniques to ensure that each user's data consumption remains proximate to the expected usage values over time. For example, the VCC algorithm may implement a holding period, during which, the user may be provisioned additional data credits but no transition between a high/low shaper may be allowed. Additionally, or alternatively, the holding period may include a user not being provisioned additional data credits until the holding period expires. Regardless, with this holding period, the VCC algorithm may keep the data consumption of each connected user approximately in-line with the expected usage values, and consequently avoid long periods of low data shaping users would otherwise experience with conventional techniques. Moreover, the holding period may alleviate performance degradation issues associated with quickly transitioning between high and low shapers faster than the system is capable of applying and/or otherwise accounting for buffer/cache differences between the various shapers.

As another example, the VCC algorithm may implement an estimate ceiling, whereby users that have not used their available data over time may not receive additional data credits over time. In this manner, the VCC algorithm may prevent users from quickly consuming large amounts of available data using a high data shaper, and thereby potentially degrading the performance of other connected users as often occurred with conventional techniques.

In accordance with the above, and with the disclosure herein, the present disclosure includes improvements in computer functionality or in improvements to other technologies at least because the disclosure describes that, e.g., an on-board communications network or otherwise computing device (e.g., a user computing device), is improved where the network traffic management and/or predictive ability of the network or computing device is enhanced by the VCC algorithm. This algorithm, executed by connected computing devices across the network, is able to accurately and efficiently determine user data consumption rates/values and corresponding data shaping adjustments required to keep such consumption rates/values aligned with predicted/estimated consumption values. That is, the present disclosure describes improvements in the functioning of the computer itself or "any other technology or technical field" because an on-board communications network or otherwise computing device, is enhanced with the VCC algorithm to accurately evaluate, predict, and modify user data consumption values/rates in a manner that improves the data consumption for all users connected to the on-board communications network. This improves over the prior art at least because existing systems lack such evaluative and/or predictive functionality and are generally unable to accurately analyze such data consumption rates/values on a real-time basis to output predictive and/or otherwise recommended data shaping adjustments designed to improve the data consumption of all connected users by creating a more consistent/uniform data consumption experience.

Moreover, the present disclosure includes effecting a transformation or reduction of a particular article to a different state or thing, e.g., transforming or reducing the low data shaping time for users connected to an on-board communications network from a non-optimal or error state (e.g., long periods of low data shaping) to an optimal state (e.g., shorter periods of low data shaping) by accurately and efficiently determining user data consumption rates/values and corresponding data shaping adjustments.

Still further, the present disclosure includes specific features other than what is well-understood, routine, conventional activity in the field, or adding unconventional steps that demonstrate, in various embodiments, particular useful applications, e.g., provisioning, by the one or more processors, a data credit for the user connection corresponding to an initial usage estimate; placing, by the one or more processors, the user connection into a first mode; initiating, by the one or more processors, a timer associated with the user connection; iteratively provisioning, by the one or more processors, additional data credits associated with the user connection based on the timer; determining, by the one or more processors, whether the user corresponding to the user connection has consumed data through the on-board network in excess of the data credit and the additional data credits; and/or responsive to determining that the user has consumed data in excess of the data credit and the additional data credits, placing, by the one or more processors, the user connection into a second mode, among others.

Additionally, although the present disclosure at times refers to a "vehicle" as being an airplane or aircraft, this is only exemplary and for ease of discussion only, and is not meant to be limiting. Indeed, the techniques described herein may easily be applied to other vehicles, e.g., other types of aircraft, ships, trains, cars, buses, or any other type of vehicle that has the ability move through the air, on the ground, through space, or on water.

FIG. 1A shows an example network traffic management scenario 100 implementing a volume control with credit (VCC) algorithm 102 to control user data consumption across an on-board communications network, in accordance with various embodiments herein. The example network traffic management scenario 100 includes the VCC algorithm 102, a first network traffic node 101, a traffic match condition node 103, a traffic ignore node 104, a data shaping node 105, a data usage counting node 106, and a second network traffic node 107. The VCC algorithm 102 includes a timer initiation signal 102a, a data credit provisioning signal 102b, an expected usage estimation node 102c, a data usage comparison node 102d, and a data shaping decision 102e.

Generally, the example network traffic management scenario 100 may include a deep packet inspection (DPI) process on received network traffic (e.g., from the first network traffic node 101) as part of implementing the VCC algorithm 102. In particular, at a beginning of a user's connection to the on-board communications network, processors implementing the scenario 100 may inspect data packets of a user's network traffic to determine/track the user's actual data usage in real time with a timer. The user's actual data usage value may also be checked against an expected usage value. Initially, the processors may shape the user's network traffic flows with a combined high shape rate, but if the user's data usage exceeds the expected usage value, then the user's network traffic flows may be shaped to a combined lower rate.

As described herein, data/time "credits" may generally refer to quantities of data (e.g., megabytes (MB), gigabytes (GB), etc.) that are allotted for each user to download, upload, and/or otherwise consume across an on-board communications network. As such, these data credits may be "provisioned" in any manner that enables tracking of the total number of data credits each user has at any given time.

In any event, the scenario 100 includes network traffic being received at the first network traffic node 101. This network traffic may be any type of data transmitted (e.g., downloaded, uploaded, etc.) across a network to/from a user computing device. When the user computing device transmits/receives this data, the VCC algorithm 102 may also receive the timer initiation signal 102a and instruct one or more processors (not shown) to initiate a timer corresponding to the user. In certain instances, the VCC algorithm 102 may not receive the timer initiation signal 102a in response to the user transmitting/receiving data across the network when, for example, the VCC algorithm 102 has previously instructed the one or more processors to initiate a timer for the respective user.

When the VCC algorithm 102 receives the timer initiation signal 102a the VCC algorithm 102 may instruct one or more processors to initiate a timer for the respective user, which may track the periods when the respective user should/may receive additional data credits. For example, a first user may receive data across the network and the VCC algorithm 102 may receive the timer initiation signal 102a to initiate a timer for the first user. When the timer for the first user exceeds a threshold value (e.g., one minute, two minutes, five minutes, etc.), the VCC algorithm 102 may instruct the processors to provision (i.e., add) additional data credits for the first user to enable the first user to consume additional data with a high data shaper applied.

The VCC algorithm 102 may also receive the data credit provisioning signal 102b, which may cause the VCC algorithm 102 to may also provision the user with an initial data credit, in accordance with the data credit provisioning signal 102b. The data credit provisioning signal 102b may also cause the VCC algorithm 102 to instruct the processors to provision additional data credits over time as the timer exceeds certain thresholds that may be known a priori or determined as part of the instructions included as part of the VCC algorithm 102. For example, a first user may receive data across the network and the VCC algorithm 102 may receive the data credit provisioning signal 102b and cause the processors to provision an initial data credit of twenty MB for the first user. Once, the timer exceeds a threshold value (e.g., one minute), the VCC algorithm 102 may subsequently instruct the processors to provision an additional data credit of twenty MB for the first user, resulting in a total data credit of 40 MB after the timer exceeds the threshold value.

Thus, as the timer proceeds to pass threshold values and the VCC algorithm 102 correspondingly instructs the processors to provision additional data credits for a user, the expected usage estimation node 102c may proceed to update the expected usage value for the user. The expected usage estimation node 102c may generally calculate expected usage values for each user connected to the network, and these expected usage values may be based on the initial data credit, the additional data credit value to be provisioned to users after the timer exceeds certain threshold values, the current time registered on the timer, and the time threshold values. As an example, the expected usage values may be calculated in accordance with the following formula:

$$E(t) = C_0 + C * \frac{t}{T_{vcc}} \quad (1)$$

where E(t) is the expected usage value, $C_o$ is the initial data credit, C is the additional data credit value, t is the current time registered on the timer, and $T_{vcc}$ is the threshold value. Of course, the expected usage estimation node 102c may include any suitable formula or otherwise set of instructions to calculate the expected usage value E(t). In certain embodiments, the expected usage estimation node 102c may utilize a non-linear equation (e.g., unlike equation (1)) and/or any other suitable formulation or combination of formulations to calculate E(t).

In any event, when the expected usage estimation node 102c estimates the expected usage value, the data usage comparison node 102d may utilize the expected usage value to determine the data shaping decision 102e. Broadly, the data usage comparison node 102d may include instructions that cause the processors to compare the expected usage value E(t) with the actual data usage value for a user. In certain embodiments, the data usage comparison node 102d may also compare the expected usage value E(t) with the actual data usage value and an expected data usage ceiling value $E_{ceiling}$.

Moreover, the data shaping applied to the user's incoming/outgoing network traffic as a result of the data shaping decision 102e may be performed in any suitable manner and/or at any suitable rate. For example, the data shaping decision 102e may indicate that the user's network traffic should be shaped with either a high data shaper (e.g., five Megabits per second (Mbps)) or a low data shaper (e.g., two Mbps), such that the user may download, upload, and/or otherwise transmit/receive data at a maximum of five Mbps or two Mbps depending on the data shaper indicated in the data shaping decision 102e. In certain embodiments, the data shaping decision 102e may indicate and the processors may apply any suitable number of data shapers. For example, the data shaping decision 102e may indicate one of three potential data shapers—low (2 Mbps), medium (3.5 Mbps), or high (5 Mbps).

If the processors determine that the actual data usage value for the user exceeds the expected usage value E(t), then the instructions included as part of the data usage comparison node 102d may cause the processors to generate a data shaping decision 102e indicating that a low data shaper should be applied to the user's incoming/outgoing network. The low data shaping rate (e.g., two Mbps) may minimize the amount of excess data consumption the user is capable of performing under high data shaping conditions, thereby bringing the user back in-line with the expected usage value E(t) more quickly over time as additional data credits are added than if the high data shaper was applied.

By contrast, if the processors determine that the actual data usage value for the user does not exceed the expected usage value E(t), then the instructions included as part of the data usage comparison node 102d may cause the processors to generate a data shaping decision 102e indicating that the high data shaper should continue to be applied to the user's incoming/outgoing network. This high data shaping may allow the user to continue receiving/transmitting data at the higher shaping rate (e.g., five Mbps) until the user meets or exceeds the expected usage value E(t).

When the data usage comparison node 102d outputs the data shaping decision 102e, the decision 102e may be passed to the data shaping node 105, which may ultimately determine whether to apply/adjust a data shaper to a user's data consumption. However, prior to such a determination, the traffic match condition node 103 may receive an indication of the user's incoming/outgoing network traffic from the first network traffic node 101 to determine whether such traffic should be shaped or ignored. The traffic match condition node 103 may analyze this indication from the first network traffic node 101, and if the traffic does not require and/or otherwise involve data shaping, the node 103 may determine (e.g., "No" branch of block 103) to ignore the traffic at block 104.

On the other hand, if the traffic match condition node 103 determines that the network traffic requires and/or otherwise involves data shaping ("Yes" branch of block 103), then the node 103 may pass the traffic to the data shaping node 105. The data shaping node 105 may thereby receive both the traffic from the traffic match condition node 103 and the data shaping decision 102e from the data usage comparison node 102d to apply an appropriate data shaper to the user's network traffic. For example, the data shaping decision 102e may indicate that a low shaper should be applied to the network traffic, and the data shaping node 105 may apply the low data shaper to the network traffic and/or subsequent network traffic associated with the user. Alternatively, the data shaping decision 102e may indicate that a high shaper should be applied to the network traffic, and the data shaping node 105 may apply the high data shaper to the network traffic and/or subsequent network traffic associated with the user. Of course, it should be appreciated that the data shaping node 105 may utilize and/or apply any suitable number and/or type of data shaper (e.g., low (2 Mbps), medium (3 Mbps), medium-high (4 Mbps), high (5 Mbps)).

Regardless of which data shaper the data shaping node 105 applies to the network traffic, the node 105 may forward an indication of the applied data shaper to the data usage counting node 106 to track the amount of data consumed by the user. Namely, the data usage counting node 106 may track the shaping applied to the user's network traffic during a specific time period to track the amount of data the user has consumed during the specific time period. For example, the data shaping node 105 may apply a low data shaper to the user's data during a first period and may consequently transmit an indication of such low data shaping to the data usage counting node 106. The data usage counting node 106 may evaluate the data packets representative of the data consumed by the user during the first period to count the amount of data (e.g., bytes of data) consumed during the first period.

The data usage counting node 106 may then transmit the total data consumed by the user during the specific time period to the data usage comparison node 102d. The data usage comparison node 102d may receive the total data consumed by the user during the specific period and include this data during subsequent iterations to output updated data shaping decisions 102e. Following this transmission to the data usage comparison node 102d, the data usage counting node 106 may transmit and/or otherwise permit transmission of the user's data through the second network traffic node 107.

It should be appreciated that the example network traffic management scenario 100 of FIG. 1A is for the purposes of discussion only, and that other implementations of the techniques described herein are possible. For example, the functions represented by the example network traffic management scenario 100 may be performed in multiple, parallel fashion for multiple, different types of network traffic. In this example, a first traffic management instance (e.g., similar to the example network traffic management scenario 100) may monitor and traffic streaming data downloaded across the on-board network while a second traffic management instance may monitor and traffic cellular data or other communications data transmitted via the on-board network. More broadly, the techniques represented by the example network traffic management scenario 100 may include monitoring data transmissions using multiple instances of the scenario 100 at any suitable level (e.g., IP level, category level, subnet level, entire system level), may leverage multiple instances of the scenario 100 to monitor/shape the upload and download directions separately, may utilize independent timers for applying additional data credits, and/or may generally perform any other suitable functions described herein using multiple instances of the example network traffic management scenario 100.

Figure 1B:
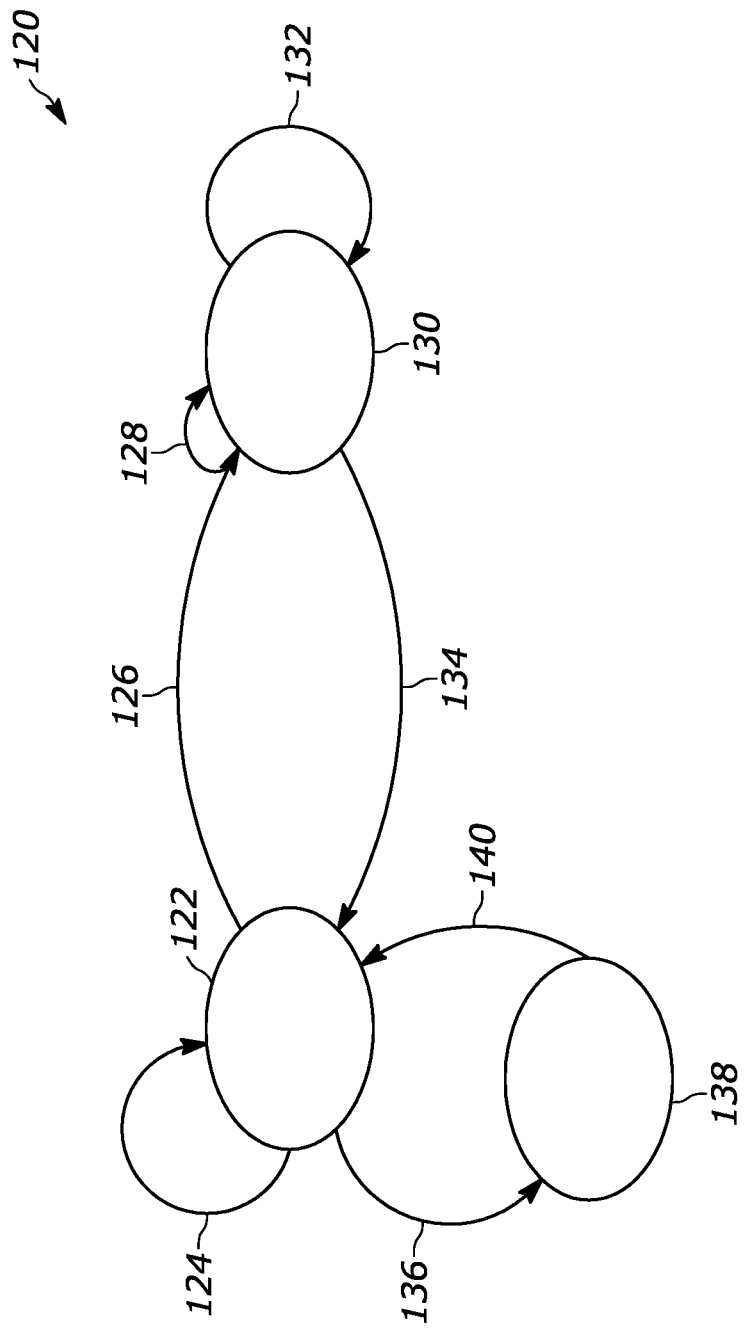
FIG. 1B depicts an example logical flow associated with the VCC algorithm, in accordance with various embodiments herein.

FIG. 1B depicts an example logical flow 120 associated with the VCC algorithm 102 of FIG. 1A, in accordance with various embodiments herein. Broadly, the example logical flow 120 represents a user initiating a data flow across an on-board communications network, and the user having their data flow shaped in accordance with the user's total amount of data usage at any given time.

More specifically, at block 122, the user may be allotted an initial data credit in accordance with an initial expected usage value/estimate and the user's data may be shaped using a high data shaper (e.g., five Mbps). The user may continue consuming data with the high data shaper applied, and the flow 120 may include frequently/periodically updating the expected usage value, for example, in accordance with the formula provided in equation (1). If the user's actual data usage value exceeds the expected usage value at any point (branch 126), then the user's data consumption may be shaped using a low data shaper (block 130).

As part of applying the low data shaper, the flow 120 may also include initiating a hold timer (branch 128), which while active, the high data shaper may not be re-applied to the user's network traffic flow. The hold timer may time a holding period, and this holding period may represent a period during which the high data shaper may not be applied to the user's network traffic flow regardless of whether the user's actual data usage exceeds the expected usage value.

For example, a first user may exceed the expected usage value by 0.5 MB, at which time, the flow 120 may include applying the low data shaper to the first user's network traffic flow and initiating the hold timer. During the holding period, the first user may be allotted an additional five MB data credit, such that the first user's actual data usage does not exceed the expected usage value. However, the flow 120 may include continuing to apply the low data shaper to the first user's network traffic flow because the hold timer has not expired (i.e., the holding period is still active). When the hold timer expires and/or otherwise indicates that the holding period is inactive, the flow 120 may include re-evaluating whether the first user's actual data usage value exceeds the expected usage value. In this example, the hold timer may expire, and the first user's actual data usage value may be seven MB while the expected usage value is ten MB. Thus, the flow 120 may include re-applying the high data shaper to the first user's network traffic flow (branch 134).

As another example, a second user may exceed the expected usage value by 0.5 MB, at which time, the flow 120 may include applying the low data shaper to the second user's network traffic flow and initiating the hold timer. During the holding period, the second user may be allotted an additional two MB data credit, such that the second user's actual data usage does not exceed the expected usage value.

However, the flow 120 may include continuing to apply the low data shaper to the second user's network traffic flow because the hold timer has not expired (i.e., the holding period is still active). When the hold timer expires and/or otherwise indicates that the holding period is inactive, the flow 120 may include re-evaluating whether the second user's actual data usage value exceeds the expected usage value. In this example, the hold timer may expire, and the second user may have consumed additional data during the holding period such that the second user's actual data usage value may be eight MB while the expected usage value is seven MB. Thus, the flow 120 may include continuing to apply the low data shaper to the second user's network traffic flow until the second user's actual data usage value does not exceed the expected usage value (branch 132).

Further in the prior example, the flow 120 may not include initiating a subsequent hold timer when the second user's actual data usage value continues to exceed the expected usage value following the holding period. In other words, after the holding period, if the second user's actual data usage value falls below the expected usage value at any time, the flow 120 may include re-applying the high data shaper to the second user's network traffic flow immediately. However, once the high data shaper is re-applied to the second user's network traffic flow, the flow 120 may include initiating another hold timer for low data shaping to the second user's network traffic flow should the second user's actual data usage value exceed the expected usage value again.

Additionally, or alternatively, the flow 120 may include determining (branch 136) whether a user's actual data usage value is less than the expected usage value by greater than a threshold amount (e.g., a "ceiling" value). This ceiling value may represent an amount of unused data credits, such that if the user exceeds this ceiling value, the flow 120 may include ceasing additional data credit provisioning (block 138). In this circumstance, the user may receive no additional data credits over time until the user's actual data usage value approaches the expected usage value and is closer to the expected usage value than the ceiling value.

For example, a first user may have an actual data usage value of three MB at a first time when the expected usage value is four MB and a ceiling value is two MB. At a second time, the first user may receive a data credit of two MB, and the first user may stop using data, such that the first user's actual data usage value remains at three MB from the second time to a third time when the first user may receive an additional data credit. However, at the third time, the first user's actual data usage value is three MB and the expected usage value is six MB, such that the first user's actual data usage value is three MB less than the expected usage value, which is greater than the ceiling value of two MB. Consequently, the flow 120 may include continuing to apply a high data shaper to the first user's network traffic flow, but ceasing to provision additional data credits to the first user over time until the difference between the first user's actual data usage value and the expected usage value is less than the ceiling value. To illustrate, at a fourth time the first user may use additional data until their actual data usage value is five MB. The first user may then receive a data credit at a fifth time when the flow 120 includes re-evaluating the first user's actual data usage value relative to the expected usage value because the difference between the first user's actual data usage value and the expected usage value is one MB, which is less than the ceiling value of two MB.

Thus, as illustrated in FIG. 1B by branch 140, when the difference between a user's actual data usage value and the expected usage value is less than or equal to the ceiling value, the flow 120 may include applying the high data shaper to the user's network traffic flow and resuming data credit provisioning. Namely, the flow 120 may transition from block 138 to block 122, where the user's network traffic flow was initially shaped with the high data shaper and data credits are provisioned at each predetermined time interval.

Overall, the example logical flow 120 illustrated in FIG. 1B greatly improves the user experience, as compared to conventional techniques. For example, if the user consumes data in bursts during short time periods, after which the user is idle for a comparatively long time, the expected usage value may accumulate during such idle periods and remain available for consumption when needed by the user. Moreover, the algorithm represented by the example logical flow 120 may help alleviate issues in conventional systems stemming from users that consume disproportionately large amounts of data. Such users can hamstring and/or otherwise negatively impact the experience of other network users by consuming excess bandwidth. To prevent this excess consumption, the example logical flow 120 may recognize such users and apply a low data shaper to the high-usage user's network traffic when their actual data usage value(s) exceed their corresponding expected usage value(s). In this manner, these high-consuming users may be strictly limited to lower their data consumption, and thereby improve the experience of other users.

Figure 2A:
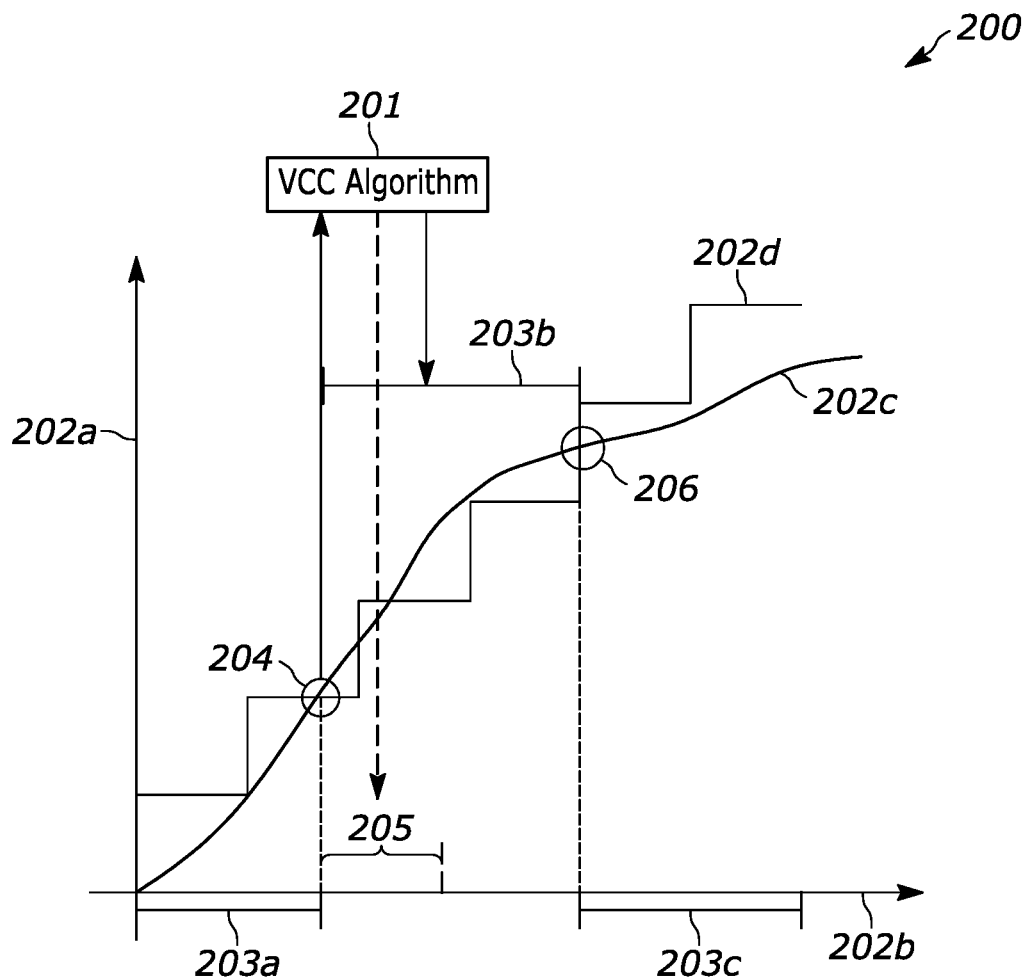
FIG. 2A depicts a first example scenario where the VCC algorithm controls user data consumption, in accordance with various embodiments herein.

FIG. 2A depicts a first example scenario 200 where the VCC algorithm 201 controls user data consumption, in accordance with various embodiments herein. The first example scenario 200 is generally represented by a data consumption graph with a first axis 202a representing total data consumption and a second axis 202b representing time. The data consumption graph also includes a user data consumption line 202c corresponding to the amount of data the user has consumed at any given time and a provisioned data credit line 202d corresponding to the total data credit provisioned to the user at any given time. Additionally, the first example scenario 200 may generally be divided into three distinct time periods 203a, 203b, 203c, wherein the VCC algorithm 201 may perform various actions to control and/or otherwise shape the user's data consumption.

More specifically, as illustrated by the first example scenario 200, the user may be allotted/provisioned an initial data credit at the initial instance when the user joins and/or otherwise connects to the on-board network at the beginning of the first time period 203a. This initial data credit may be any suitable value, such as 20 MB, 10 MB, 50 MB, and/or any other suitable value. In any event, the user may consume data during the first time period 203a in a first mode (e.g., high data shaper~five Mbps) until, at point 204, the user consumes data in excess of the allotted data credit despite being issued a first additional data credit during the first time period 203a. After this point 204, the VCC algorithm 201 may determine that the user has exceeded the provisioned data credit and may place the user's data consumption in a second mode (e.g., low data shaper~two Mbps).

During the second time period 203b, the VCC algorithm 201 may monitor the user's data usage to determine whether and when the user's total data consumption fails to exceed the total provisioned data credit. However, as part of this determination, the VCC algorithm 201 may initially keep the user's data consumption in the second mode for a predetermined time period 205 (referenced herein as a "holding period") to ensure that the user's data consumption is not erroneously placed in the first mode at a time when the user's data consumption will again quickly exceed the provisioned data credit. This holding period 205 may last for any suitable duration, such as thirty seconds, 70 seconds, 100 seconds, and/or any other suitable duration. When the holding period 205 has elapsed, the VCC algorithm 201 may place the user's data consumption back into the first mode (e.g., high data shaper) when the user's total data consumption fails to exceed the provisioned data credit. Namely, the user's total data consumption may fail to exceed the provisioned data credit at point 206 and the VCC algorithm 201 may determine that the user's data consumption should be placed back in the first mode (e.g., high data shaper).

Generally speaking, the holding period 205 may serve to avoid the user consuming data so quickly that the user's data consumption may be placed in the second mode (e.g., low data shaper) for significant periods of time, thereby avoiding an unsavory user experience with the on-board network. Moreover, this process of placing the user's data consumption in a lower data shaping mode when the user's data consumption exceeds the provisioned data credit and holding the user's data consumption in the lower data shaping mode for a predetermined period may cause the user's data consumption to oscillate around and/or otherwise remain near the provisioned data credit line 202d over time. Thus, each user may generally consume data at a rate that is commensurate with the amount of data credit provisioned to the respective users, which reduces the bottlenecking that can occur in circumstances when certain users consume excess amounts of data and reduce the bandwidth available for other network users and/or reduce the system demands associated with quickly oscillating between data shaping modes at a rate that the system may be unable to accommodate. Namely, the holding period may alleviate performance degradation issues associated with quickly transitioning between high and low shapers faster than the system is capable of applying and/or otherwise accounting for buffer/cache differences between the various shapers.

To illustrate, the user may exceed the provisioned data credit at the point 204, and the VCC algorithm 201 may place the user's data consumption in the second mode and begin a timer associated with the holding period 205. During this holding period 205, the user's data consumption fails to exceed the provisioned data credit line 202d, but the VCC algorithm 201 may not place the user's data consumption back into the first mode. By doing so, the VCC algorithm 201 may prevent the user from exceeding the provisioned data credit even faster than illustrated in FIG. 2A by the user data consumption line 202c. Thus, the user would exceed the provisioned data credit sooner during the holding period 205, and as a result, the user's data consumption may be high enough during the remainder of the second period 203b that the user's data consumption continues to exceed the provisioned data credit line 202d at the end of the second period 203b. Accordingly, the VCC algorithm 201 would not place the user's data consumption back into the first mode, and the user's overall experience using the on-board network would be worse because the user's data consumption spends more time in the second mode. Further, as mentioned, without the holding period, the user's data consumption would quickly transition between high and low shapers faster than the system is capable of applying and/or otherwise accounting for buffer/cache differences between the various shapers, thereby leading to further performance issues.

Figure 2B:
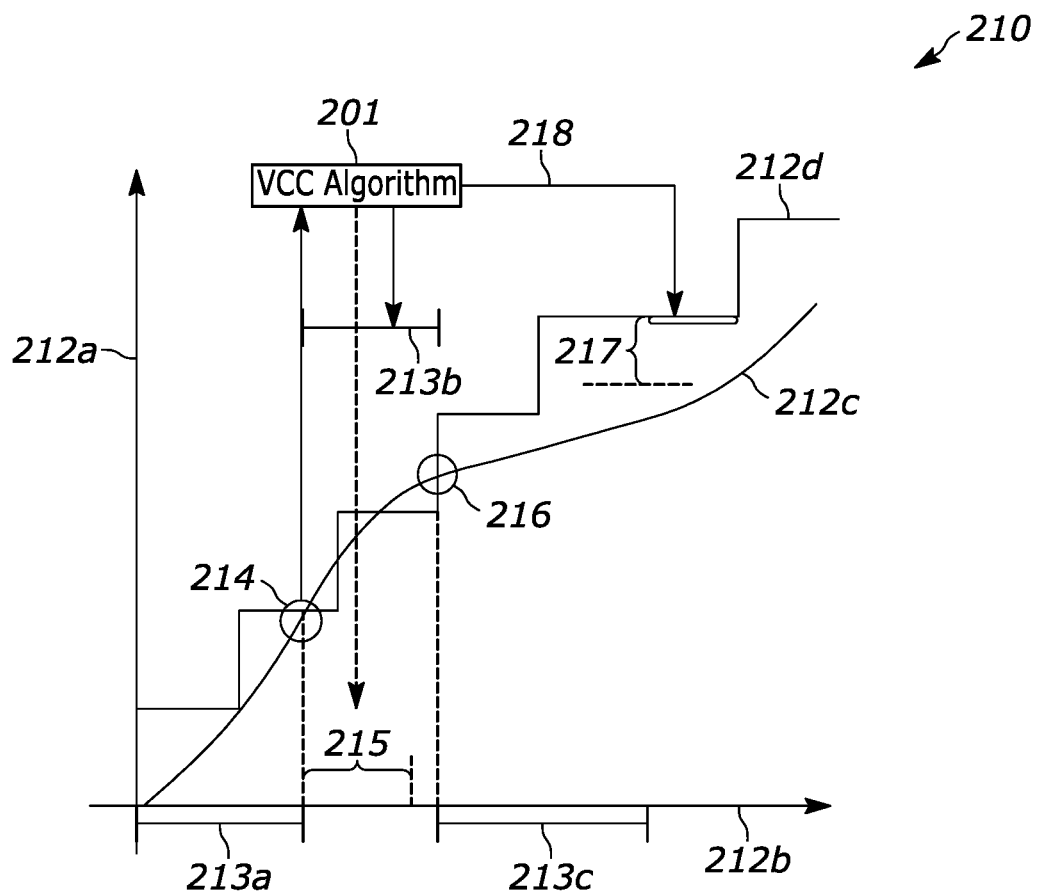
FIG. 2B depicts a second example scenario where the VCC algorithm controls user data consumption, in accordance with various embodiments herein.

FIG. 2B depicts a second example scenario 210 where the VCC algorithm 201 controls user data consumption, in accordance with various embodiments herein. The second example scenario 210 is generally represented by a data consumption graph with a first axis 212a representing total data consumption and a second axis 212b representing time. The data consumption graph also includes a user data consumption line 212c corresponding to the amount of data the user has consumed at any given time and a provisioned data credit line 212d corresponding to the total data credit provisioned to the user at any given time. Additionally, the second example scenario 210 may generally be divided into three distinct time periods 213a, 213b, 213c, wherein the VCC algorithm 201 may perform various actions to control and/or otherwise shape the user's data consumption.

More specifically, as illustrated by the second example scenario 210, the user may be allotted/provisioned an initial data credit at the initial instance when the user joins and/or otherwise connects to the on-board network at the beginning of the first time period 213a. Similar to the first example scenario 200, the user may consume data during the first time period 213a in a first mode (e.g., high data shaper~five Mbps) until, at point 214, the user consumes data in excess of the allotted data credit despite being issued a first additional data credit during the first time period 213a. After this point 214, the VCC algorithm 201 may determine that the user has exceeded the provisioned data credit and may place the user's data consumption in a second mode (e.g., low data shaper~two Mbps).

During the second time period 213b, the VCC algorithm 201 may monitor the user's data usage to determine whether and when the user's total data consumption fails to exceed the total provisioned data credit. The VCC algorithm 201 may also initially keep the user's data consumption in the second mode for the holding period 215 to ensure that the user's data consumption is not erroneously placed in the first mode at a time when the user's data consumption will again quickly exceed the provisioned data credit. When the holding period 215 has elapsed, the VCC algorithm 201 may place the user's data consumption back into the first mode (e.g., high data shaper) when the user's total data consumption fails to exceed the provisioned data credit. Namely, the user's total data consumption may fail to exceed the provisioned data credit at point 216 and the VCC algorithm 201 may determine that the user's data consumption should be placed back in the first mode (e.g., high data shaper).

However, during the third period 213c, and prior to the user receiving a fifth additional data credit, the VCC algorithm 201 may determine that the user's data consumption has not satisfied a ceiling threshold 217. In particular, at point 218, the VCC algorithm 201 may analyze the user's data consumption to determine a differential between the user's total data consumption and the total provisioned data credits provisioned to the user's data consumption. If the VCC algorithm 201 determines that the differential between the user's data consumption and the total provisioned data credits is greater than the ceiling threshold 217, the VCC algorithm 201 may determine that the user should not be provisioned any additional data credits. The VCC algorithm 201 may re-evaluate the differential between the user's data consumption and the total provisioned data credits until the differential is less than the ceiling threshold 217, at which point, the VCC algorithm 201 may determine that additional data credits may resume periodic provisioning to the user's data consumption at the rate previously determined (e.g., every minute, 30 seconds, five minutes, etc.).

Generally speaking, the ceiling threshold 217 may serve to avoid absent, latent, and/or otherwise non-data-consuming users from unendingly accumulating unused data credits. Without such a ceiling threshold 217, such latent users could accumulate vast amounts of data credits and thereafter consume their provisioned data credits so quickly that the user's data consumption negatively impacts the on-board network experience for other connected users. Thus, the ceiling threshold 217 ensures that latent connected users may only receive data credits sufficient to allow the users to consume data when they return at a rate and in quantities that avoid impacting other network users.

Figure 2C:
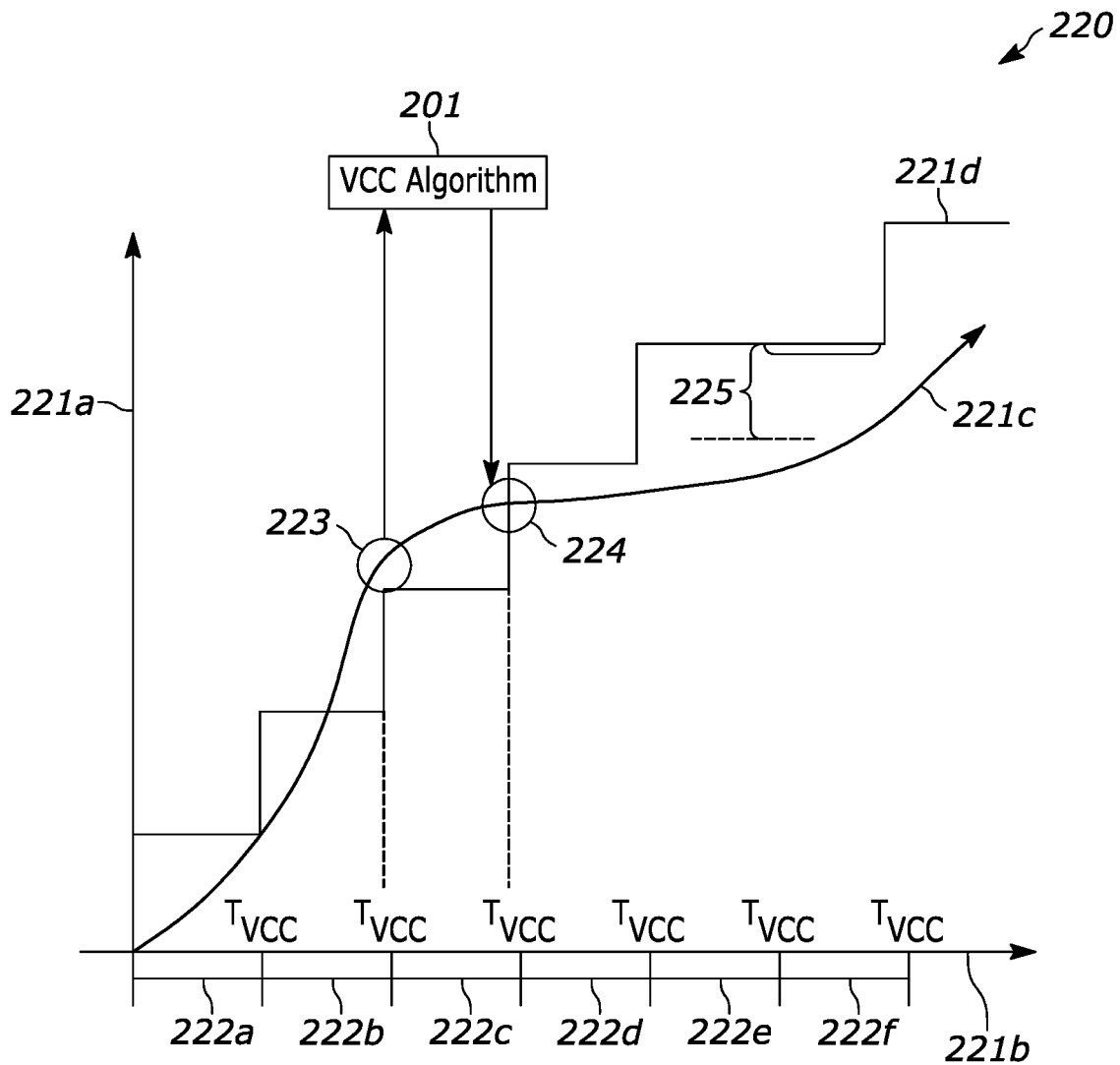
FIG. 2C depicts a third example scenario where the VCC algorithm controls user data consumption, in accordance with various embodiments herein.

FIG. 2C depicts a third example scenario 220 where the VCC algorithm 201 controls user data consumption, in accordance with various embodiments herein. The third example scenario 220 is generally represented by a data consumption graph with a first axis 221a representing total data consumption and a second axis 221b representing time. The data consumption graph also includes a user data consumption line 221c corresponding to the amount of data the user has consumed at any given time and a provisioned data credit line 221d corresponding to the total data credit provisioned to the user at any given time. Additionally, the third example scenario 220 may generally be divided into six distinct time periods 222a, 222b, 222c, 222d, 222e, 222f, wherein the VCC algorithm 201 may perform various actions to control and/or otherwise shape the user's data consumption. In particular, at the beginning/end of each time period 222a-f, the VCC algorithm 201 may analyze the total data consumption of the user (e.g., user data consumption line 221c) and the total provisioned data credits to the user (e.g., provisioned data credit line 221d), and the VCC algorithm 201 may determine whether to provision additional data credits to the user. As referenced herein, the "end" of a particular time period 222a-f may coincide with the "beginning" of a subsequent time period 222a-f. Thus, for example, the end of the third time period 222c may coincide with the beginning of the fourth period 222d, such that the two may be referenced interchangeably.

As illustrated by the third example scenario 220, the user may be allotted/provisioned an initial data credit at the initial instance when the user joins and/or otherwise connects to the on-board network at the beginning of the first time period 222a. The user may consume data during the first time period 222a in a first mode (e.g., high data shaper~five Mbps) and at the end of the first time period 222a, the VCC algorithm 201 may evaluate whether the user's total data consumption has exceeded the total provisioned data credit. In the third example scenario 220, and at the end of the first time period 222a, the VCC algorithm 201 may determine that the user's total data consumption has not exceeded the total provisioned data credit, and may continue to shape the user's data consumption in the first mode. However, during the second time period 222b, the user's total data consumption may exceed the total provisioned data credits. Because the VCC algorithm 201 only evaluates the user's total data consumption at the end of the respective time periods 222a-f in the third example scenario 220, the user's data consumption may continue to be shaped in accordance with the first mode despite exceeding the total provisioned data credits. At the end of the second time period 222b, the VCC algorithm 201 may determine that the user's total data consumption has exceeded the total provisioned data credit (as indicated at point 223) and may place the user's data consumption in a second mode (e.g., low data shaper~two Mbps).

In the third example scenario 220, the VCC algorithm 201 may not begin a holding period, as described in reference to the first and second example scenarios 200, 210, because the user's data consumption is only evaluated at the end of each time period 222a-f. To illustrate, when the user's data consumption is placed in the second mode at point 223, the user's data consumption may continue in the second mode for the entirety of the third period 222c because the user's total data consumption may continue to exceed the total provisioned data credits for the entirety of the third period 222c. The first time at which the user's total data consumption may fail to exceed the total provisioned data credits is the next time at which the user is provisioned additional data credits (e.g., beginning of the fourth period 222d). At the end of the third time period 222c, the VCC algorithm 201 may determine that the user's total data consumption does not exceed the total provisioned data credit (as indicated at point 224) and may place the user's data consumption back into the first mode.

Generally speaking, comparing the expected usage (reflected in the provisioned data credits) to the user's total data usage at specified time intervals may reduce the processing and memory resources required when constantly comparing such values. These resource issues can be amplified significantly when there are a large number of users connected to an on-board network, many of whom consume data approaching and/or exceeding their provisioned data credits. Thus, the periodic evaluation of the user's data consumption ensures that those processing and memory resources are conserved and thereby enables the network system to efficiently place network users in one or more shaping modes that keep the network users in-line with the expected data usage values.

Moreover, at the end of the fifth period 222e, and prior to the user receiving a fifth additional data credit, the VCC algorithm 201 may determine that the user's data consumption has not satisfied a ceiling threshold 225. In particular, the VCC algorithm 201 may analyze the user's data consumption to determine that the differential between the user's total data consumption and the total provisioned data credits provisioned to the user's data consumption is greater than the ceiling threshold 225, and the VCC algorithm 201 may not provisioned any additional data credits to the user. The VCC algorithm 201 may re-evaluate the differential between the user's data consumption and the total provisioned data credits at the end of the sixth period 222f, and may determine that the differential is less than the ceiling threshold 225, at which point, the VCC algorithm 201 may determine that additional data credits may resume periodic provisioning to the user's data consumption at the rate previously determined (e.g., every minute, 30 seconds, five minutes, etc.).

Figure 2D:
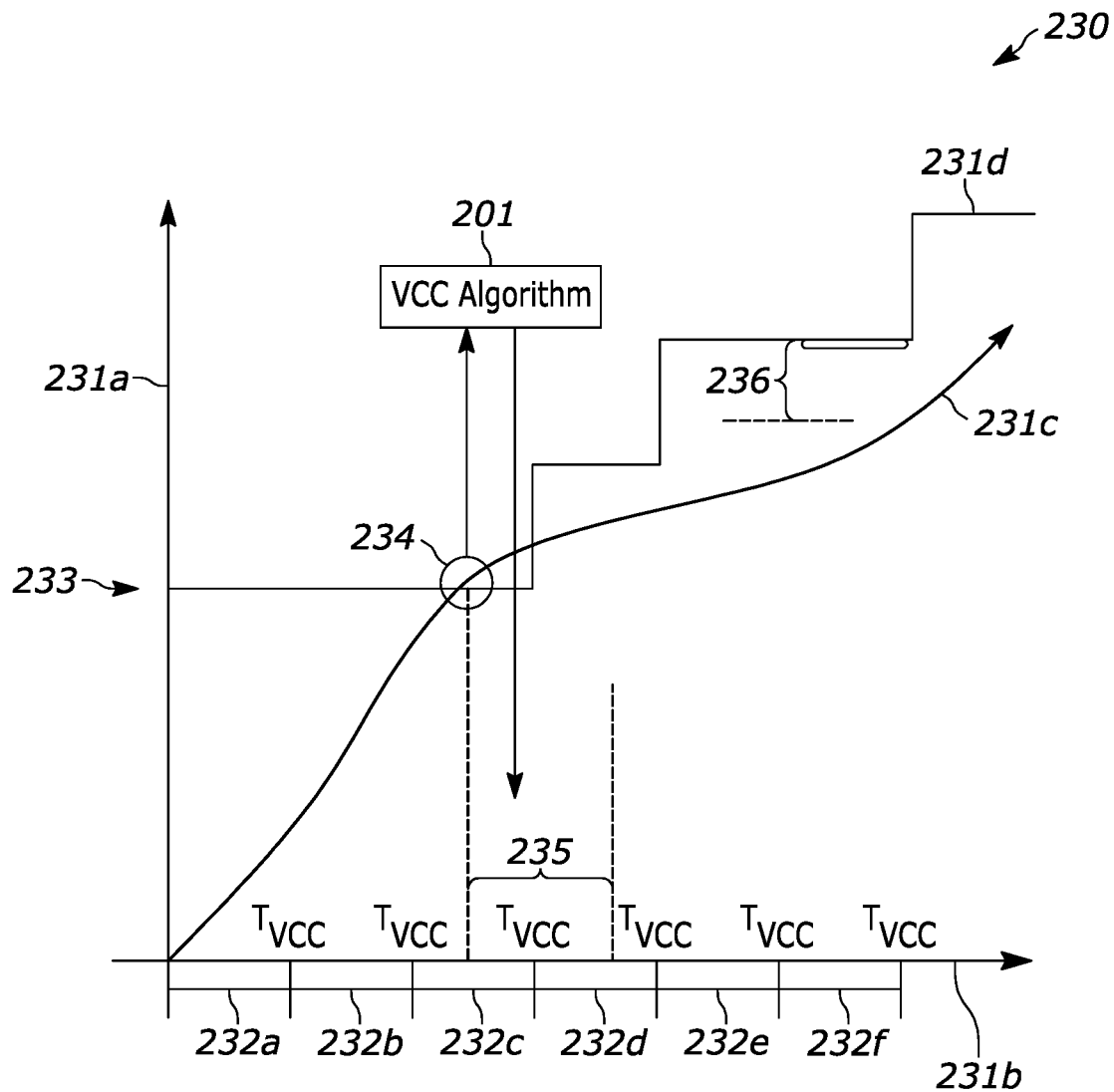
FIG. 2D depicts a fourth example scenario where the VCC algorithm controls user data consumption, in accordance with various embodiments herein.

FIG. 2D depicts a fourth example scenario 230 where the VCC algorithm 201 controls user data consumption, in accordance with various embodiments herein. The fourth example scenario 230 is generally represented by a data consumption graph with a first axis 231a representing total data consumption and a second axis 231b representing time. The data consumption graph also includes a user data consumption line 231c corresponding to the amount of data the user has consumed at any given time and a provisioned data credit line 231d corresponding to the total data credit provisioned to the user at any given time. Additionally, the fourth example scenario 230 may generally be divided into six distinct time periods 232a, 232b, 232c, 232d, 232e, 232f, wherein the VCC algorithm 201 may perform various actions to control and/or otherwise shape the user's data consumption.

In particular, at the beginning/end of each time period 232a-f, the VCC algorithm 201 may analyze the total data consumption of the user (e.g., user data consumption line 231c) and the total provisioned data credits to the user (e.g., provisioned data credit line 231d), and the VCC algorithm

201 may determine whether to provision additional data credits to the user. However, as illustrated by the fourth example scenario 230, the VCC algorithm 201 may initially provision a relatively large data credit when a user initially connects to the on-board network and may subsequently provision smaller data credits over time. Namely, the VCC algorithm 201 may initially provision a large data credit of a first magnitude 233 (e.g., 60 MB, 100 MB, etc.), and may only proceed to provision additional data credits once the user has consumed this initial data credit.

As illustrated by the fourth example scenario 220, the user may consume data during the first time period 232$a$, the second time period 232$b$, and a portion of the third time period 232$c$ in a first mode (e.g., high data shaper~five Mbps). At point 234 during the third time period 232$c$, the user's total data consumption may exceed the total provisioned data credits and the VCC algorithm 201 may place the user's data consumption in a second mode (e.g., low data shaper~two Mbps). The VCC algorithm 201 may also initiate a holding period 235, during which, the user's data consumption may remain in the second mode regardless of whether the user's total data consumption fails to exceed the total provisioned data credits at any point during the holding period 235. For example, when the user receives an additional data credit at the beginning of the fourth time period 232$d$, the user's total data consumption may not exceed the total provisioned data credits, but the VCC algorithm 201 may maintain the user's data consumption may in the second mode because the holding period 235 has not expired. When the holding period 235 expires, the VCC algorithm 2012 may then place the user's data consumption back into the first mode.

Generally speaking, provisioning a relatively large initial data credit may curb the excessive data consumption of high-consuming network users while allowing average and below average data consuming users an improved experience due to the shaping applied to such high-consuming users. Average to below average data consuming users may experience high data shaping for considerable periods of time before exceeding the initial credit, thereby having a very satisfactory experience using the on-board network. Additionally, when high-consuming network users reach the end of their initially provisioned data credit, these users may have lower data shapers applied to their data consumption, thereby bringing their data consumption in-line with estimations, as described herein. Thus, the fourth example scenario 230 represents a data credit provisioning scheme that may provide average and below-average data consuming network users a smooth, fast experience with the on-board network, while managing the data consumption high-consuming network users in a manner that does not severely shape their data consumption.

Moreover, at the end of the fifth period 232$e$, and prior to the user receiving a third additional data credit, the VCC algorithm 201 may determine that the user's data consumption has not satisfied a ceiling threshold 236. In particular, the VCC algorithm 201 may analyze the user's data consumption to determine that the differential between the user's total data consumption and the total provisioned data credits provisioned to the user's data consumption is greater than the ceiling threshold 236, and the VCC algorithm 201 may not provisioned any additional data credits to the user. The VCC algorithm 201 may re-evaluate the differential between the user's total data consumption and the total provisioned data credits at the end of the sixth period 232$f$, and may determine that the differential is less than the ceiling threshold 236, at which point, the VCC algorithm 201 may determine that additional data credits may resume periodic provisioning to the user's data consumption at the rate previously determined (e.g., every minute, 30 seconds, five minutes, etc.).

Figure 3:
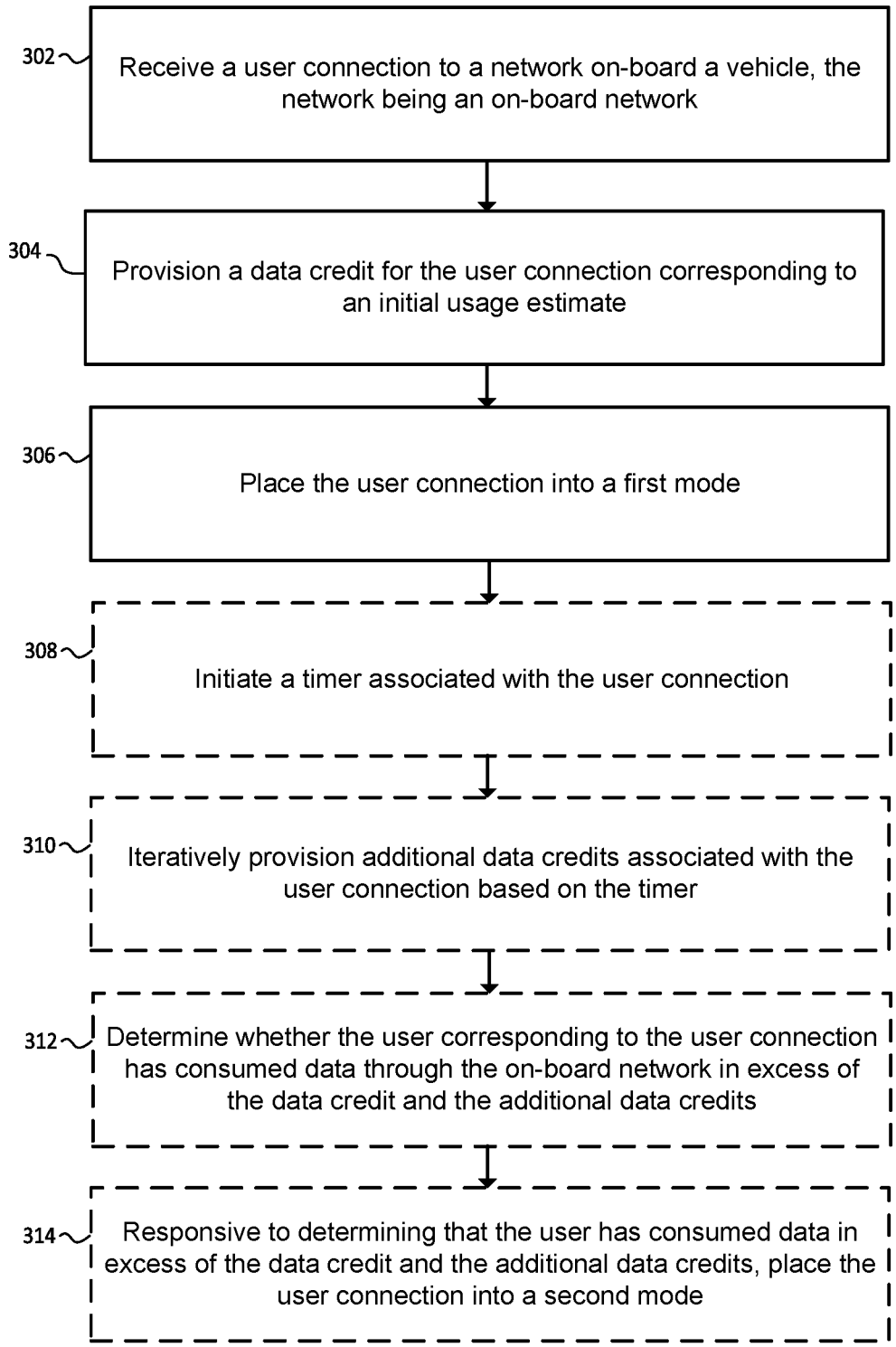
FIG. 3 depicts a flow diagram of an example method for controlling user data consumption, in accordance with various embodiments herein.

FIG. 3 depicts a flow diagram of an example method 300 for controlling user data consumption, in accordance with various embodiments herein. The example method 300 may include receiving a user connection to a network on-board a vehicle (block 302). The network may be an on-board network. The example method 300 may further include provisioning a data credit for the user connection corresponding to an initial usage estimate (block 304). The example method 300 may further include placing the user connection into a first mode (block 306).

The example method 300 may optionally further include initiating a timer associated with the user connection (block 308). The example method 300 may optionally further include iteratively provisioning additional data credits associated with the user connection based on the timer (block 310). The example method 300 may optionally further include determining whether the user corresponding to the user connection has consumed data through the on-board network in excess of the data credit and the additional data credits (block 312). The example method 300 may optionally further include responsive to determining that the user has consumed data in excess of the data credit and the additional data credits, placing the user connection into a second mode (block 314).

In certain embodiments, the example method 300 may further include continuously provisioning the additional data credits to the user connection based on a current time from the timer, the initial usage estimate, and a time interval threshold.

In some embodiments, the first mode may be a high shaper mode, the second mode may be a low shaper mode, and the example method 300 may further include placing the user connection into the second mode by applying a low shaper to network traffic consumed through the user connection.

In certain embodiments, iteratively provisioning the additional data credits may further include determining that a time indicated by the timer has exceeded a predetermined time interval; and provisioning the additional data credits.

In some embodiments, the example method 300 may further include responsive to placing the user connection into the second mode, holding the user connection in the second mode for a minimum time. Further in these embodiments, the example method 300 may further include determining (i) the user has no longer consumed data in excess of the data credit and the additional data credits and (ii) the minimum time has elapsed; and placing the user connection into the first mode.

In certain embodiments, the example method 300 may further include determining that data consumed by the user is less than the data credit and the additional data credits by a ceiling value; and withholding a subsequent data credit from the user connection.

In some embodiments, iteratively provisioning the additional data credits may further include provisioning an initial additional data credit in response to the user consuming the data credit; and iteratively provisioning subsequent additional data credits based on the timer.

In certain embodiments, the vehicle is an aircraft.

Figure 4:
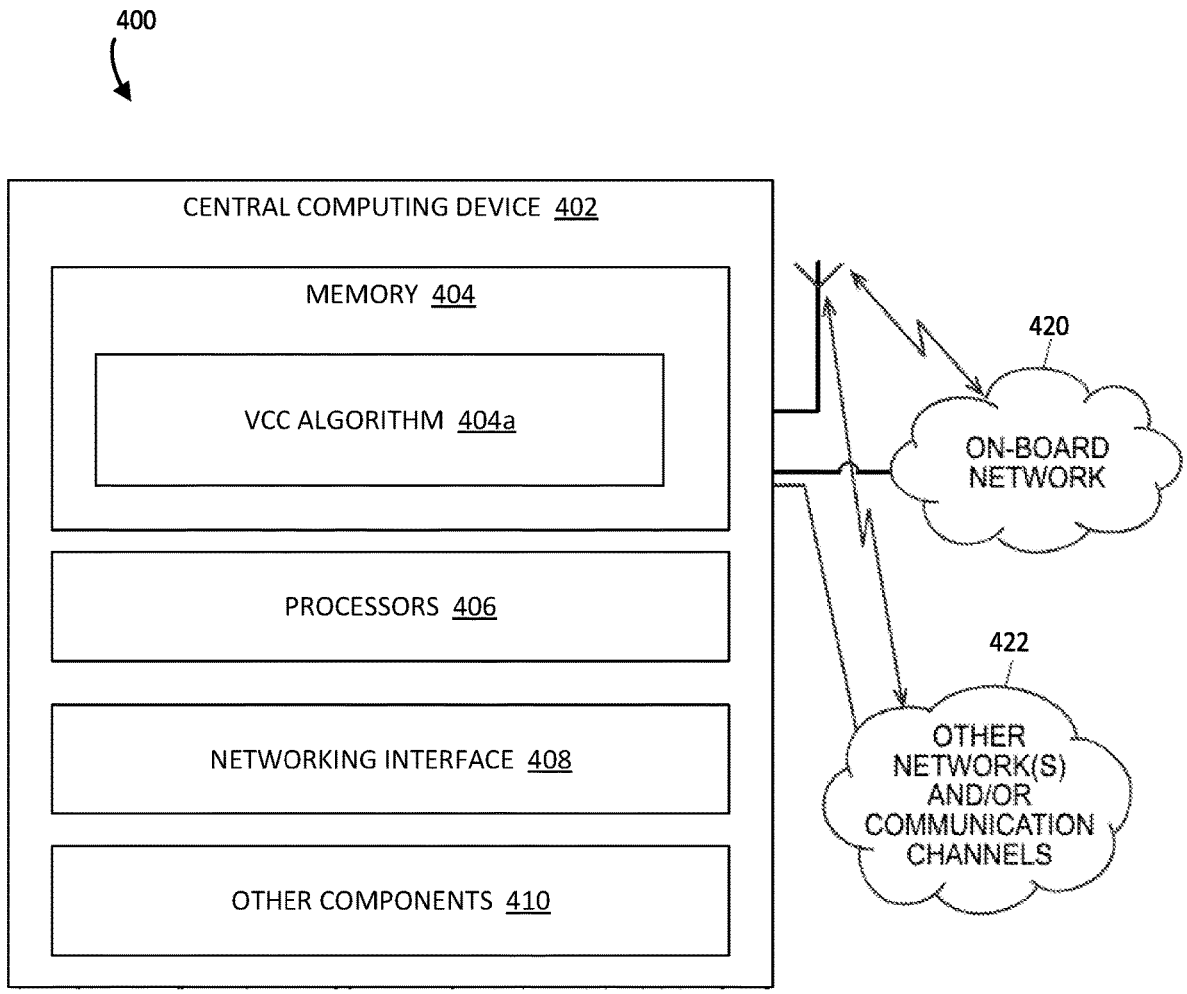
FIG. 4 is a block diagram of an example system in which a VCC algorithm is implemented to control user data consumption, in accordance with various embodiments herein.

FIG. 4 is a block diagram of an example system 400 in which a VCC algorithm 404$a$ is implemented to control user data consumption, in accordance with various embodiments herein. In the example system 400, the on-board communications network 420 may be a public or publicly-accessible network, e.g., a network that any member of the public may access via his or her computing or electronic device so long as certain criteria are met (such as providing the appropriate network key, agreeing to conditions and terms, paying for the use of the network and/or for services provided by the network, etc.), and the on-board communications network 420 may be secured or unsecured. The example system 400 may operate in conjunction with a central computing device 402 which may determine how and when to shape data consumption for various users connected to the on-board network 420. The system 400 may also execute one or more portions of the example method 300 of FIG. 3, in an embodiment. In some embodiments, the system 400 may execute all of the example method 300.

The example system 400 may include a VCC algorithm 404a, which is illustrated in FIG. 4 as being disposed at the central computing device 402. In an embodiment, the VCC algorithm 404a may comprise a set of computer-executable instructions that are stored on a tangible, non-transitory computer-readable storage medium of the central computing device 402, such as a memory 404. The computer-executable instructions may be executable by one or more processors 406 of the central computing device 402, for example. In some embodiments, at least a portion of the VCC algorithm 404a may comprise firmware and/or hardware. At any rate, whether implemented in software, firmware, and/or hardware, the VCC algorithm 404a may be configured to provision data credits toward a connected user's data consumption across the on-board network 420, and to change the shaping applied to the user's data consumption in response to the user exceeding the data credit.

It is noted that although the VCC algorithm 404a is illustrated in FIG. 4 as being stored in the memory 404 of the central computing device 402, this is merely illustrative and thus a non-limiting embodiment. For example, the VCC algorithm 404a may not reside at the central computing device 402, but instead may reside on a memory (and maybe executed by a processor) of another computing device that is disposed within the vehicle and in communicative connection with the central computing device 402. In an embodiment, the other computing device on which the VCC algorithm 404a resides may be accessed by the central computing device 402 via a network and/or communication channel 422 other than the public on-board communications network 420. For example, the central computing device 402 and the other computing device may communicate by utilizing a near-field communications channel. In another embodiment, the other computing device on which the VCC algorithm 404a resides may be accessed by the central computing device 402 via the on-board network 420, however this access may be a limited access. For instance, the central computing device 402 may be granted access to only a remote VCC algorithm 404a via the on-board network 420, and/or the limited access of the central computing device 402 via the network 420 may be granted for only a certain window of time.

The central computing device 402 may include one or more networking interfaces 408. For example, the networking interfaces 408 may include one or more wireless communication interfaces (e.g., transceivers and antennas for Wi-Fi, cellular, short-range wireless, near-field communications, etc.) via which the central computing device 402 is able to communicatively connect to one or more types of wireless networks, and/or the networking interfaces 408 may include one or more wired communication interfaces (e.g., Ethernet, HDMI, Fiber optics cables, and/or other physical ports) via which the central computing device 402 is able to communicatively connect to one or more types of wired networks. The central computing device 402 may utilize one or more of its networking interfaces 408 (e.g., optionally one or more of its wired/wireless communication interfaces) to connect to the on-board network 420.

Further, the central computing device 402 may include other components 410 such as a bus, various memories or storage devices such as Random Access Memories (RAM) and Read Only Memories (ROM), and other components. It is noted that although a finite number of components 404-410 are shown in FIG. 4, other numbers and types of components may be included in the central computing device 402. For example, the central computing device 402 may include fewer components, more components, and/or different components than is illustrated by FIG. 4.

In some embodiments of the example system 400, the VCC algorithm 404a may be stored in the memory 404 of the central computing device 402. For example, the VCC algorithm 404a may be implemented as part of one or more applications that are stored and executed on the central computing device 402. In an embodiment, the VCC algorithm 404a may be included in one or more applications that are provided by the on-board service provider to be downloaded to passengers' devices so that the devices are able to access on-board networks and services provided by the on-board service provider (e.g., an on-board service application of the on-board service provider). In these embodiments, the VCC algorithm 404a may be associated with a user and/or a user account of the on-board service provider, and may be downloaded from a server (or set of back-end computing devices) of the on-board service provider to the central computing device 402. Typically, but not necessarily, the back-end server or servers are located on the ground, and are accessible via ground-based public and private networks, such as the Internet. In some situations, though, the VCC algorithm 404a may be downloaded from a server that is on-board the vehicle.

In certain embodiments, upon the central computing device 402 detecting the presence of the on-board network 420 and at least one user connected to the on-board network 420, the VCC algorithm 404a may automatically be initialized, invoked, and/or otherwise executed to determine whether or not the user (e.g., via their connected device) is presently exceeding a data credit allocated through execution of the VCC algorithm 404a. In embodiments in which the VCC algorithm 404a is included in an application that is provided by the on-board service provider to be downloaded onto passenger devices (e.g., an on-board service application) to monitor each user's data consumption via on-board networks and services, the VCC algorithm 404a may be automatically initialized, invoked, and/or otherwise executed when the on-board service application is initialized. Other triggers may cause the VCC algorithm 404a to be automatically invoked, e.g., the user opening any application on their device that consumes data across the on-board network 420, an explicit user request, the reception of user input at any user computing device, etc.

Further, although FIG. 4 illustrates one embodiment of the example system 400, other embodiments (not shown) may be possible. To illustrate, it should be appreciated that the example system 400, any portion of the example system 400 (e.g., VCC algorithm 404a), and/or any other system, sub-system, and/or any other components described herein may be implemented at any suitable location (e.g., a central server/computing device, a data center, an on-board vehicle device), distributed across any suitable number of different locations (e.g., multiple servers/computing devices, cloud computing system(s)).

Figure 5:
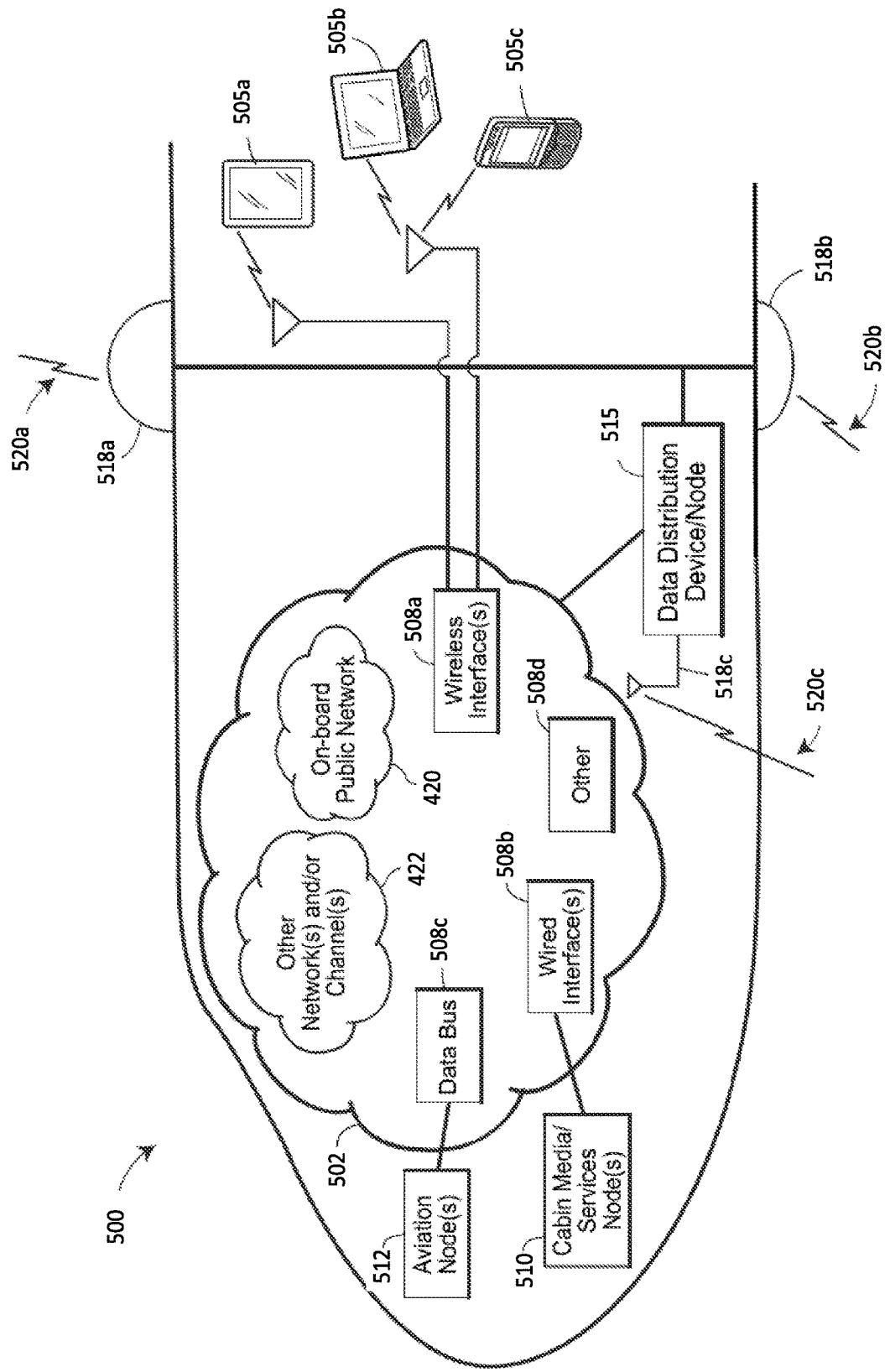
FIG. 5 is a block diagram of an example vehicle having one or more on-board communications networks, the traffic of which may be managed by a VCC algorithm(s), in accordance with various embodiments herein.

FIG. 5 is a block diagram of an example vehicle 500 having one or more on-board communications networks, the traffic of which may be managed by a VCC algorithm(s), in accordance with various embodiments herein. The computing or electronic devices 505a, 505b, 505c that passengers, crew, and other members of the public bring on-board the vehicle 500 may be granted access to the one or more on-board communications networks 502 and have data consumption monitored and shaped via, for example, the method 300 of FIG. 3 and/or the system 400 of FIG. 4. The vehicle 500 is depicted in FIG. 5 as an airplane in flight, however, the techniques described herein may easily be applied to other vehicles that provide transport for people, such as other types of aircraft, ships, trains, cars, buses, or any other type of vehicle that has the ability move through the air, on/under the ground, through space, or on water. Further, the one or more on-board networks 502 may include, for example, the public, on-board network 420 and/or other networks 422 of FIG. 4, and indeed, any of the components, principles, methods, apparatuses, devices, and/or techniques discussed with respect to FIG. 5 are applicable to any of the components, principles, methods, apparatuses, devices, and/or techniques discussed with respect to FIGS. 1A-4. Additionally, the one or more on-board communications networks 502 may include one or more other public and/or private networks.

The one or more on-board networks 502 may include a plurality of nodes. A "node," as generally referred to herein, may comprise one or more computing devices having one or more processors, a network interface, and one or more memories storing computer-executable instructions. The instructions may be executed by the processor(s) to perform one or more actions. For example, the computer-executable instructions may be executed to communicate, via the network interface, over one or more networks for various purposes, e.g., to discover other nodes, services, and/or applications, to publish or provide services to the network, to consume published or provided services, and/or to perform other actions. Additionally, or alternatively, nodes may execute instructions stored thereon to host various services and/or to execute various applications and/or algorithms (e.g., VCC algorithm 404a), at some of which may be made available to other nodes. In some embodiments, a node may additionally or alternatively comprise firmware and/or hardware that are operable to perform one or more actions. In some embodiments, a node may include one or more user interfaces and/or one or more network interfaces.

In some scenarios, a node may be a logical entity. For example, a node may comprise a virtual machine hosted by or executed on one or more computing devices, or a "node" may comprise an interpreted scripting or engine hosted by or executed on one or more computing devices. As such, in some embodiments, multiple nodes may reside on a single, physical computing device.

In some embodiments, a node may be located on or within a vehicle so that the node is transported along with the vehicle as the vehicle moves, e.g., a "transported node." For example, a transported node may be an end-user consumer computing device such as a laptop computer, a handheld portable computing device, a phone, tablet or smart device, or other device that generally is not fixedly or rigidly attached to the vehicle by a tangible, physical connection. In other examples, a transported node may be a computing device that is fixedly and/or rigidly connected to a vehicle using a tangible, physical connection so that node is prevented from moving about the vehicle in an uncontrolled fashion when the vehicle moves. For example, a fixedly connected, transported node such as a navigation device, a cockpit electronics unit, a cabin electronics unit, or other device may be included in a line replaceable unit (LRU) on-board and fixedly connected to the vehicle. Indeed, a vehicle may transport multiple nodes, at least some of which are rigidly and fixedly connected to the vehicle, and at least some of which are not rigidly and fixedly connected to the vehicle. Typically, but not necessarily, nodes that include sensors and/or monitoring devices that generate vehicle travel or heuristic data may be fixedly connected to the vehicle.

For ease of discussion, the one or more on-board communications networks 502 disposed within the vehicle 500 are generally referred to herein using the singular tense. However, it is understood that the on-board communications network 502 may include one or more wired networks, one or more wireless networks, or a collection of wired and wireless networks. The one or more networks 502 may include one or more private and/or public networks. In some embodiments, the network 502 may include multiple different types of wired and wireless network links or data bearer channels implementing different link-layer and network-layer protocols. For example, the one or more on-board network 502 may include one or more wireless networks or interfaces 508a, such as to a cellular communications network localized to the cabin of the aircraft, to a Wi-Fi network, to a wireless Ethernet network, to a Bluetooth® or other short distance wireless communications system, to a near-field wireless communications (NFC) system, to a satellite system, etc. On-board devices or nodes that have wireless communication abilities may connect to the network 502 via one or more wireless interfaces 508a, for example. In an embodiment, at least one of the wireless interfaces 508a may provide access to the public, on-board communications network 420.

Additionally or alternatively, the network 502 may include one or more wired networks or interfaces 508b, such as a wired Ethernet, Local Talk, or other type of CSMA/CD (Carrier Sense Multiple Access/Collision Detection) network, token ring, FDDI (Fiber Distributed Data Interface), ATM (Asynchronous Transfer Mode), etc. Examples of nodes that may connect to the network 502 via wired interfaces 508b include a cabin entertainment/media node 510 that stores in-flight entertainment and other consumable content, and/or devices utilized by the cabin crew for flight services purposes (e.g., communications between crew members, passenger service and safety, etc.). In an embodiment, at least one of the wired interfaces 508b may provide access to the public, on-board communications network 420.

Further, in some embodiments, the network 502 may include an aircraft data bus or other suitable interface 508c to on-board aviation-specific networks 512 via which connections may be established to, for example, cockpit electronics nodes, flight instrumentation systems, on-board maintenance systems, and the like. For example, the data utilized by aviation nodes 512 may be compliant with the ARINC-429, MIL-STD-1553, IEEE 802.3, and/or any other suitable standard or combinations thereof. Generally, aviation-specific networks 512 may be private networks that are walled off against public use or access. Still further, the network 502 may include other types of networks and interfaces 508d to other types of nodes (not shown). Examples of some (but not all possible) types of networks which may be included in the one or more networks 502 are described in U.S. patent application Ser. No. 13/675,200, filed Nov. 13, 2012 and entitled "Vehicle Data Distribution System and Method," and in U.S. patent application Ser. No. 13/675,190 entitled "Ground System for Vehicle Data Distribution" and now issued as U.S. Pat. No. 9,088,613, the disclosures of which are hereby incorporated by reference in their entireties.

Another node of the on-board communications network 502 may be a data distribution node or device 515. The data distribution node or device 515 may be fixedly connected to the vehicle (e.g., via an LRU when the vehicle 500 is an aircraft), and may be the node via which data is received onto and delivered from the vehicle 500 while the vehicle 500 is in transit and/or is stationary. For ease of reading, the data distribution node or device 515 is referred to herein using the singular tense, as the node/device 515 may have a singular logical appearance to other nodes of the network 502. However, the data distribution node or device 515 may be implemented utilizing multiple physical computing devices or nodes, if desired.

Typically, the data distribution node or device 515 may be communicatively connected to one or more transceiver/antenna systems 518a, 518b, 518c over which data is transmitted via a corresponding wireless link or bearer that may communicatively connect to an antenna/transceiver that is disposed on the ground or that is otherwise external to the vehicle 500. For example, the data distribution node 515 may send and/or receive data via a satellite transceiver/antenna system 518a that uses a satellite wireless link or bearer 520a (e.g., over the Ku-band, Ka-band, L-band, S-band, etc.) to deliver data from and/or receive data onto the vehicle 500. Additionally, or alternatively, the data distribution node 515 may send and/or receive data via an air-to-ground (ATG) transceiver/antenna system 518b that uses a non-satellite, ATG wireless link or bearer 520b (e.g., over the S-band, cellular/LTE bands, or other designated band) to deliver data from and/or receive data onto the vehicle 500. Still additionally or alternatively, the data distribution node 515 may send and/or receive data via a Wi-Fi, cellular, satellite, and/or other ground-based wireless transceiver/antenna system 518c and link/bearer 520c to deliver data from and/or receive data onto the vehicle 500. (Typically, the ground-based wireless transceiver/antenna system 518c may have a shorter range than that of the other systems 58a, 518b and may be utilized only when the vehicle is not air-borne and/or is parked.) In some embodiments, the vehicle 500 may include a transceiver/antenna system (not shown) over which data may be transmitted via a corresponding air-to-air wireless link that communicatively connects the vehicle 500 with another air-borne vehicle. While FIG. 5 illustrates the vehicle 500 as including multiple types of transceiver/antenna systems 518a, 518b, 518c via which data may be delivered onto and off of the vehicle 500, in some embodiments, the vehicle 500 may include only one of the transceiver/antenna systems 518a, 518b for data delivery, and/or may not include the transceiver/antenna system 518c. Examples of data delivery links for transporting data to/from the on-board network 502 may be found in aforementioned U.S. patent application Ser. No. 13/675,200 and U.S. Pat. No. 9,088,613.

Generally, the data distribution node or device 515 may aggregate or otherwise package data received from on-board nodes for delivery off of the vehicle 500 via one or more of the transceiver/antenna systems 518a-518c and their respective wireless links 520a-520c. Additionally, the data distribution node or device 515 may disaggregate or otherwise un-package data received onto the vehicle via one or more of the transceiver/antenna systems 518a-518c and their respective wireless links 520a-520c, and may route various data packets included therein via the network 502 to respective on-board destination nodes. Examples of embodiments of the data distribution node or device 515 may be found in aforementioned U.S. patent application Ser. No. 13/675,200 and U.S. Pat. No. 9,088,613.

The data distribution device 515 may enable personal tablets 505a, computers 505b, phones/smart devices 505c, and/or other computing or electronic devices that have been brought on-board the vehicle 500 and that have been granted access to the public on-board network 420 (e.g., via the example method 300 and/or the example system 400) to communicate with other devices that are not on-board the vehicle 500 or that are on the ground. For example, data may be delivered, between one of the on-board devices 505a-505c and a ground computing device, via the on-board public network 420, one or more other portions of the network 502, the data distribution node 515, and one or more of the transceiver/antennas 518a, 518b and their respective wireless links 520a, 520b. Additionally, or alternatively, the data distribution device 515 may enable one or more of the on-board devices 505a-505c to communicate with other devices that are on-board the vehicle via the on-board public network 420 and other portions of the network 502, provided that appropriate permission and/or authorization criteria are met.

Typically, but not necessarily, the aviation nodes 512, the cabin media/services nodes 510, and the data distribution node 515 are implemented in line-replaceable-units (LRUs) that are fixedly connected to the vehicle. An LRU may be an electronic assembly that performs a specific function in the aircraft 500 and that may be removed or replaced as a unit and serviced at an aircraft maintenance center or flight line.

In an embodiment, the aviation nodes 512, the data distribution node 515, and/or other nodes of the network 502 may include one or more devices and/or components that generate, sense, monitor, and/or detect vehicle travel, heuristic data, and/or information corresponding to data consumption/usage across the network 502. For example, the aviation nodes 512, the data distribution node 515, and/or other nodes of the network 502 may include one or more accelerometers, compasses, GPS receivers, altimeters, and/or other components that detect or sense the spatial orientation, location, position, movement, speed, and other vehicle travel or heuristic data while the vehicle 500 is in transit. In an embodiment, information corresponding to the data consumption/usage across the network 502 consumed by devices 505a-505c may be transmitted from the aviation nodes 512, the data distribution node 515, and/or other nodes of the network 502 to one or more central computing devices 402 (e.g., executing the VCC algorithm 404a) for analysis and/or decisions associated with shaping subsequent data consumption of such devices 505a-505c, such as in a manner similar to that discussed with respect to FIGS. 1A-4.

Although the foregoing text sets forth a detailed description of numerous different embodiments, it should be understood that the scope of the patent is defined by the words of the claims set forth at the end of this patent. The detailed description is to be construed as exemplary only and does not describe every possible embodiment because describing every possible embodiment would be impractical, if not impossible. Numerous alternative embodiments could be implemented, using either current technology or technology developed after the filing date of this patent, which would still fall within the scope of the claims and all equivalents thereof. By way of example, and not limitation, the disclosure herein contemplates at least the following aspects:

1. A method for controlling user data consumption, the method comprising: receiving, at one or more processors, a user connection to a network on-board a vehicle, the network being an on-board network; and executing, by the one or more processors, a volume control with credit (VCC) algorithm by: provisioning, by the one or more processors, a data credit for the user connection corresponding to an initial usage estimate; placing, by the one or more processors, the user connection into a first mode; initiating, by the one or more processors, a timer associated with the user connection; iteratively provisioning, by the one or more processors, additional data credits associated with the user connection based on the timer; determining, by the one or more processors, whether the user corresponding to the user connection has consumed data through the on-board network in excess of the data credit and the additional data credits; and responsive to determining that the user has consumed data in excess of the data credit and the additional data credits, placing, by the one or more processors, the user connection into a second mode.

2. The method of aspect 1, further comprising: continuously provisioning, by the one or more processors, the additional data credits to the user connection based on a current time from the timer, the initial usage estimate, and a time interval threshold.

3. The method of any of aspects 1 or 2, wherein the first mode is a high shaper mode, the second mode is a low shaper mode, and the method further comprises: placing, by the one or more processors, the user connection into the second mode by applying a low shaper to network traffic consumed through the user connection.

4. The method of any of aspects 1 through 3, wherein iteratively provisioning the additional data credits further comprises: determining, by the one or more processors, that a time indicated by the timer has exceeded a predetermined time interval; and provisioning, by the one or more processors, the additional data credits.

5. The method of any of aspects 1 through 4, further comprising: responsive to placing the user connection into the second mode, holding, by the one or more processors, the user connection in the second mode for a minimum time.

6 The method of aspect 5, further comprising: determining, by the one or more processors, (i) the user has no longer consumed data in excess of the data credit and the additional data credits and (ii) the minimum time has elapsed; and placing, by the one or more processors, the user connection into the first mode.

7. The method of any of aspects 1 through 6, further comprising: determining, by the one or more processors, that data consumed by the user is less than the data credit and the additional data credits by a ceiling value; and withholding, by the one or more processors, a subsequent data credit from the user connection.

8. The method of any of aspects 1 through 7, wherein iteratively provisioning the additional data credits further comprises: provisioning, by the one or more processors, an initial additional data credit in response to the user consuming the data credit; and iteratively provisioning, by the one or more processors, subsequent additional data credits based on the timer.

9. The method of any of aspects 1 through 8, wherein the vehicle is an aircraft.

10. A system for controlling user data consumption, the system comprising: one or more processors; and a non-transitory computer-readable memory coupled to the one or more processors, the memory storing a volume control with credit (VCC) algorithm and instructions thereon that, when executed by the one or more processors, cause the one or more processors to: receive a user connection to a network on-board a vehicle, the network being an on-board network, execute the VCC algorithm by: provisioning a data credit for the user connection corresponding to an initial usage estimate, placing the user connection into a first mode, initiating a timer associated with the user connection, iteratively provisioning additional data credits associated with the user connection based on the timer, determining whether the user corresponding to the user connection has consumed data through the on-board network in excess of the data credit and the additional data credits, and responsive to determining that the user has consumed data in excess of the data credit and the additional data credits, placing the user connection into a second mode.

11. The system of aspect 10, wherein the instructions, when executed, further cause the one or more processors to: continuously provision the additional data credits to the user connection based on a current time from the timer, the initial usage estimate, and a time interval threshold.

12. The system of any of aspects 10 or 11, wherein the first mode is a high shaper mode, the second mode is a low shaper mode, and the instructions, when executed, further cause the one or more processors to: placing, by the one or more processors, the user connection into the second mode by applying a low shaper to network traffic consumed through the user connection.

13. The system of any of aspects 10 through 12, wherein the instructions, when executed, further cause the one or more processors to iteratively provision the additional data credits by: determining that a time indicated by the timer has exceeded a predetermined time interval; and provisioning the additional data credits.

14. The system of any of aspects 10 through 13, wherein the instructions, when executed, further cause the one or more processors to: responsive to placing the user connection into the second mode, hold the user connection in the second mode for a minimum time.

15. The system of aspect 14, wherein the instructions, when executed, further cause the one or more processors to: determine (i) the user has no longer consumed data in excess of the data credit and the additional data credits and (ii) the minimum time has elapsed; and place the user connection into the first mode.

16. The system of any of aspects 10 through 15, wherein the instructions, when executed, further cause the one or more processors to: determine that data consumed by the user is less than the data credit and the additional data credits by a ceiling value; and withhold a subsequent data credit from the user connection.

17. The system of any of aspects 10 through 16, wherein the instructions, when executed, further cause the one or more processors to iteratively provision the additional data credits by: provisioning an initial additional data credit in response to the user consuming the data credit; and iteratively provision subsequent additional data credits based on the timer.

18. The system of any of aspects 10 through 17, wherein the vehicle is an aircraft.

19. A tangible non-transitory computer-readable medium comprising instructions for controlling user data consumption that, when executed, cause a machine to at least: receive a user connection to a network on-board a vehicle, the network being an on-board network; and execute a volume control with credit (VCC) algorithm by: provisioning a data credit for the user connection corresponding to an initial usage estimate; placing the user connection into a first mode; initiate a timer associated with the user connection; iteratively provisioning additional data credits associated with the user connection based on the timer; determining whether the user corresponding to the user connection has consumed data through the on-board network in excess of the data credit and the additional data credits; and responsive to determining that the user has consumed data in excess of the data credit and the additional data credits, placing the user connection into a second mode.

20. The tangible non-transitory computer-readable medium of aspect 19, wherein the first mode is a high shaper mode, the second mode is a low shaper mode, and the instructions, when executed, further cause the machine to at least: responsive to placing the user connection into the second mode, hold the user connection in the second mode for a minimum time; determine (i) the user has no longer consumed data in excess of the data credit and the additional data credits and (ii) the minimum time has elapsed; and place the user connection into the first mode.

Thus, many modifications and variations may be made in the techniques and structures described and illustrated herein without departing from the spirit and scope of the present claims. Accordingly, it should be understood that the methods and apparatus described herein are illustrative only and are not limiting upon the scope of the claims.

Although the following text sets forth a detailed description of numerous different embodiments, it should be understood that the legal scope of the description is defined by the words of the claims set forth at the end of this patent and equivalents. The detailed description is to be construed as exemplary only and does not describe every possible embodiment since describing every possible embodiment would be impractical. Numerous alternative embodiments could be implemented, using either current technology or technology developed after the filing date of this patent, which would still fall within the scope of the claims.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term be limited, by implication or otherwise, to that single meaning. Finally, unless a claim element is defined by reciting the word "means" and a function without the recital of any structure, it is not intended that the scope of any claim element be interpreted based on the application of 35 U.S.C. § 112, sixth paragraph.

What is claimed is:

1. A method for controlling user data consumption, the method comprising:
   receiving, at one or more processors, a user connection to a network on-board a vehicle, the network being an on-board network; and
   executing, by the one or more processors, a volume control with credit (VCC) algorithm by:
      provisioning, by the one or more processors, a data credit for the user connection corresponding to an initial usage estimate;
      placing, by the one or more processors, the user connection into a first mode;
      initiating, by the one or more processors, a timer associated with the user connection;
      iteratively provisioning, by the one or more processors, additional data credits associated with the user connection based on the timer;
      determining, by the one or more processors, whether a user corresponding to the user connection has consumed data through the on-board network in excess of the data credit and the additional data credits; and
      responsive to determining that the user has consumed data in excess of the data credit and the additional data credits, placing, by the one or more processors, the user connection into a second mode corresponding to a low data shaper relative to the first mode.

2. The method of claim 1, further comprising:
   continuously provisioning, by the one or more processors, the additional data credits to the user connection based on a current time from the timer, the initial usage estimate, and a time interval threshold.

3. The method of claim 1, wherein the first mode is a high shaper mode, the second mode is a low shaper mode, and the method further comprises:
   placing, by the one or more processors, the user connection into the second mode by applying the low data shaper to network traffic consumed through the user connection.

4. The method of claim 1, wherein iteratively provisioning the additional data credits further comprises:
   determining, by the one or more processors, that a time indicated by the timer has exceeded a predetermined time interval; and
   provisioning, by the one or more processors, the additional data credits.

5. The method of claim 1, further comprising:
   responsive to placing the user connection into the second mode, holding, by the one or more processors, the user connection in the second mode for a minimum time.

6. The method of claim 5, further comprising:
   determining, by the one or more processors, (i) the user has no longer consumed data in excess of the data credit and the additional data credits and (ii) the minimum time has elapsed; and
   placing, by the one or more processors, the user connection into the first mode.

7. The method of claim 1, further comprising:
   determining, by the one or more processors, that data consumed by the user is less than the data credit and the additional data credits by a ceiling value; and
   withholding, by the one or more processors, a subsequent data credit from the user connection.

8. The method of claim 1, wherein iteratively provisioning the additional data credits further comprises:
   provisioning, by the one or more processors, an initial additional data credit in response to the user consuming the data credit; and
   iteratively provisioning, by the one or more processors, subsequent additional data credits based on the timer.

9. The method of claim 1, wherein the vehicle is an aircraft.

10. A system for controlling user data consumption, the system comprising:
    one or more processors; and
    a non-transitory computer-readable memory coupled to the one or more processors, the memory storing a volume control with credit (VCC) algorithm and instructions thereon that, when executed by the one or more processors, cause the one or more processors to:
receive a user connection to a network on-board a vehicle, the network being an on-board network, and execute the VCC algorithm by:
provisioning a data credit for the user connection corresponding to an initial usage estimate,
placing the user connection into a first mode,
initiating a timer associated with the user connection,
iteratively provisioning additional data credits associated with the user connection based on the timer,
determining whether a user corresponding to the user connection has consumed data through the on-board network in excess of the data credit and the additional data credits, and
responsive to determining that the user has consumed data in excess of the data credit and the additional data credits, placing the user connection into a second mode corresponding to a low data shaper relative to the first mode.

11. The system of claim 10, wherein the instructions, when executed, further cause the one or more processors to:
continuously provision the additional data credits to the user connection based on a current time from the timer, the initial usage estimate, and a time interval threshold.

12. The system of claim 10, wherein the first mode is a high shaper mode, the second mode is a low shaper mode, and the instructions, when executed, further cause the one or more processors to:
placing, by the one or more processors, the user connection into the second mode by applying the low data shaper to network traffic consumed through the user connection.

13. The system of claim 10, wherein the instructions, when executed, further cause the one or more processors to iteratively provision the additional data credits by:
determining that a time indicated by the timer has exceeded a predetermined time interval; and
provisioning the additional data credits.

14. The system of claim 10, wherein the instructions, when executed, further cause the one or more processors to:
responsive to placing the user connection into the second mode, hold the user connection in the second mode for a minimum time.

15. The system of claim 14, wherein the instructions, when executed, further cause the one or more processors to:
determine (i) the user has no longer consumed data in excess of the data credit and the additional data credits and (ii) the minimum time has elapsed; and
place the user connection into the first mode.

16. The system of claim 10, wherein the instructions, when executed, further cause the one or more processors to:
determine that data consumed by the user is less than the data credit and the additional data credits by a ceiling value; and
withhold a subsequent data credit from the user connection.

17. The system of claim 10, wherein the instructions, when executed, further cause the one or more processors to iteratively provision the additional data credits by:
provisioning an initial additional data credit in response to the user consuming the data credit; and
iteratively provision subsequent additional data credits based on the timer.

18. The system of claim 10, wherein the vehicle is an aircraft.

19. A tangible non-transitory computer-readable medium comprising instructions for controlling user data consumption that, when executed, cause a machine to at least:
receive a user connection to a network on-board a vehicle, the network being an on-board network; and
execute a volume control with credit (VCC) algorithm by:
provisioning a data credit for the user connection corresponding to an initial usage estimate;
placing the user connection into a first mode;
initiating a timer associated with the user connection;
iteratively provisioning additional data credits associated with the user connection based on the timer;
determining whether a user corresponding to the user connection has consumed data through the on-board network in excess of the data credit and the additional data credits; and
responsive to determining that the user has consumed data in excess of the data credit and the additional data credits, placing the user connection into a second mode corresponding to a low data shaper relative to the first mode.

20. The tangible non-transitory computer-readable medium of claim 19, wherein the first mode is a high shaper mode, the second mode is a low shaper mode, and the instructions, when executed, further cause the machine to at least:
responsive to placing the user connection into the second mode, hold the user connection in the second mode for a minimum time;
determine (i) the user has no longer consumed data in excess of the data credit and the additional data credits and (ii) the minimum time has elapsed; and
place the user connection into the first mode.

* * * * *